United States Patent [19]
Chikauchi et al.

[11] Patent Number: 5,868,484
[45] Date of Patent: Feb. 9, 1999

[54] PORTABLE OVERHEAD PROJECTOR

[75] Inventors: Masami Chikauchi; Naohiko Noda, both of Iruma; Seiji Tachibana, Hamura; Hiroyuki Yokokawa, Kawasaki; Yasunori Hagari, Hamura, all of Japan

[73] Assignee: Casio Computer Co., Ltd., Tokyo, Japan

[21] Appl. No.: 636,586

[22] Filed: Apr. 23, 1996

[30] Foreign Application Priority Data

Apr. 25, 1995 [JP] Japan .................................... 7-123020
Dec. 29, 1995 [JP] Japan .................................... 7-352557

[51] Int. Cl.⁶ .................................................. G03B 21/14
[52] U.S. Cl. ...................................... 353/119; 353/DIG. 3
[58] Field of Search ............................... 353/119, 65, 66, 353/63, 64, DIG. 4, DIG. 3

[56] References Cited

U.S. PATENT DOCUMENTS

| | | | |
|---|---|---|---|
| 3,951,535 | 4/1976 | Altman | 353/65 |
| 4,588,271 | 5/1986 | Emura | 353/66 |
| 4,696,557 | 9/1987 | Tomizuka | 353/DIG. 4 |
| 4,776,688 | 10/1988 | Ushiro et al. | 353/66 |
| 4,921,343 | 5/1990 | Ushiro et al. | 353/66 |
| 4,938,587 | 7/1990 | Namioka et al. | 353/66 |
| 4,978,218 | 12/1990 | Carpenter et al. | 353/DIG. 4 |
| 4,986,651 | 1/1991 | Vanderwerf | 353/DIG. 4 |
| 5,317,350 | 5/1994 | Nomura et al. | 353/DIG. 4 |
| 5,345,282 | 9/1994 | Ushiro et al. | 353/63 |
| 5,452,032 | 9/1995 | Aosaki et al. | 353/DIG. 4 |

Primary Examiner—William Dowling
Attorney, Agent, or Firm—Frishauf, Holtz, Goodman, Langer & Chick

[57] ABSTRACT

A portable overhead projector includes a projection unit having a light source and a projection lens, a stage having a Fresnel lens which has a reflecting surface facing the projection unit, and an arm part for connecting the projection unit with the stage. The arm is sized to accommodate the projection unit and the stage when these are folded thereinto. The size of the projector when the projection unit and the stage are folded into the arm part is not substantially larger than approximately a length of 184 mm, a width of 135 mm, and a thickness of 58 mm. Since each member can be folded, it is possible to make the portable overhead projector compact so that users can conveniently carry such an overhead projector in their bags.

24 Claims, 36 Drawing Sheets

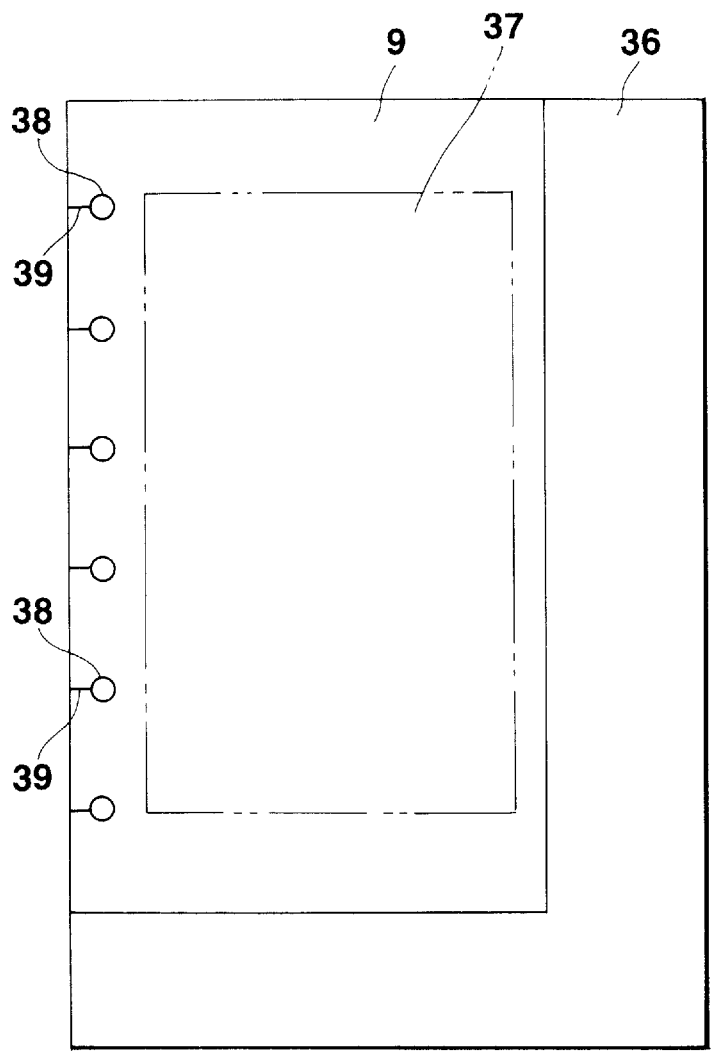 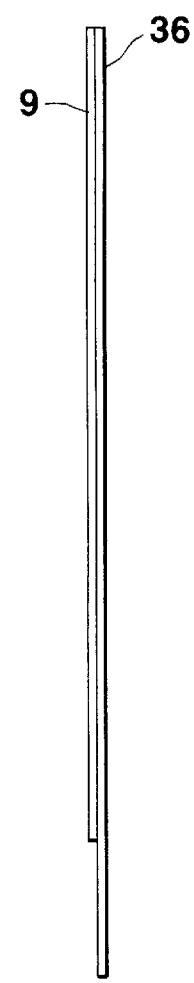
FIG.6A   FIG.6B

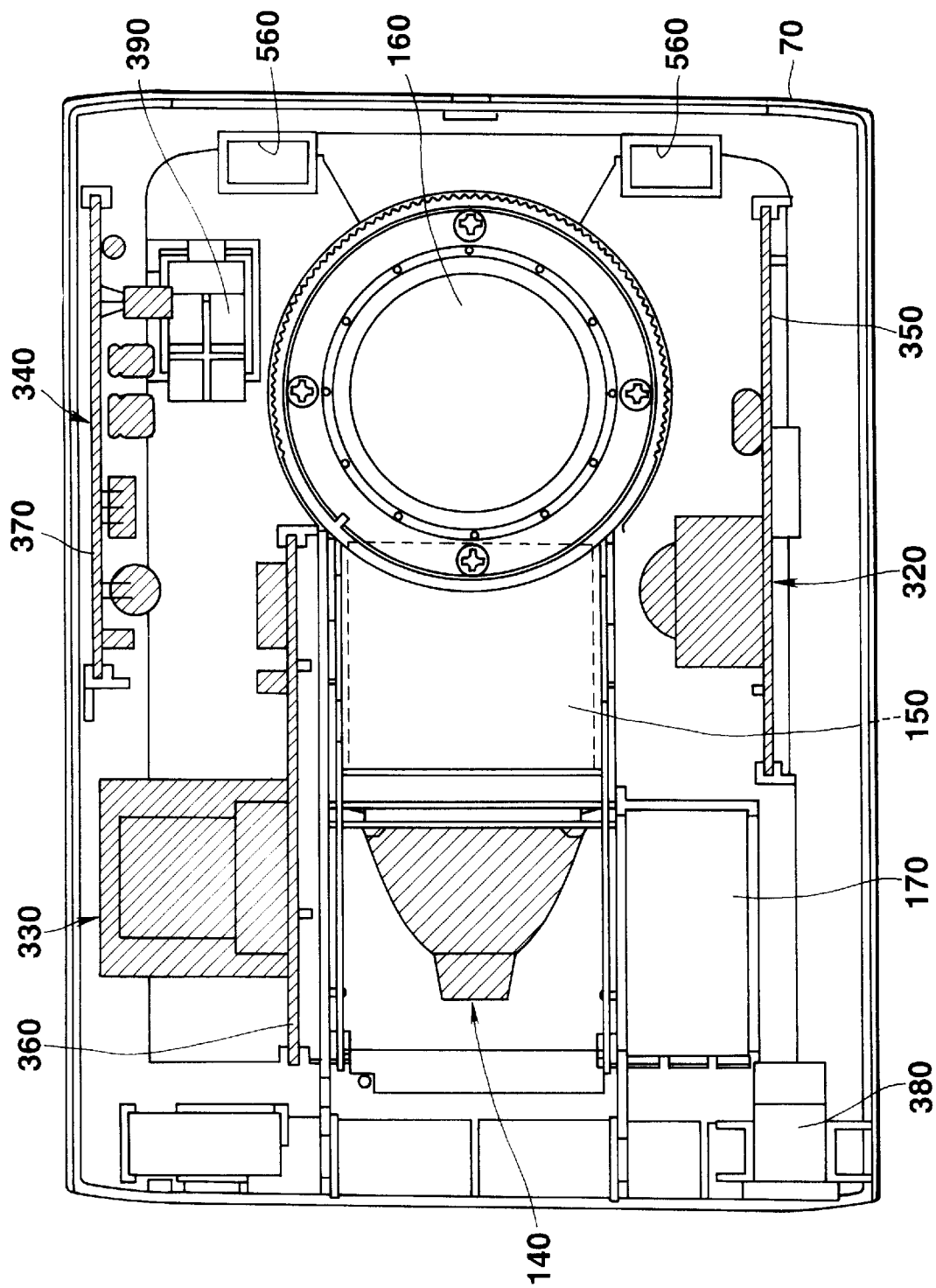

PORTABLE OVERHEAD PROJECTOR

BACKGROUND OF THE INVENTION

1. Field of the Invention

The present invention relates to a portable overhead projector.

2. Description of the Prior Art

An overhead projector generally has a structure in which an image projection sheet on which an image for projection is formed is placed on a stage, the image on the image projection sheet is enlargedly projected on a screen through a projection lens by the light emanating from a light source illuminating the image projection sheet. The image projection sheet used in the overhead projector is a transparent sheet on which an image for projection is formed. The image projection sheet having an A4 size in JIS (the Japanese Industrial Standards) is generally used, in order to print out an information such as a document, an image or the like which were formed by using a personal computer, a word processor or the like, by a printer conveniently.

In order to strongly assist, for example, sales by a salesman, a good portability is required for such an overhead projector. In response to this requirement, although various types of overhead projectors have been developed and produced, there is a problem of further miniaturization being difficult because these overhead projectors have a structure in which image projection sheets having a size up to A4 can be used, so that it is impossible to make the stage smaller than the image projection sheets having an A4 size. Therefore, in the present condition, it is hardly for user, e.g., salesmen or the like, to conveniently carry such an overhead projector in their bags or the like.

In order to solve the problems in the present condition, the present inventors have aimed at the size of the image projection sheets and have made it smaller, and thus the present inventors have studied miniaturization, making light weight, and portability, of the whole device of the overhead projector. Accordingly, it has been found that there are following various problems. For example, if the image projection sheets are simply formed in a small size similar to that of a pocket notebook, because the sheets cannot be transferred by a feed roller of a printer, a copying machine or the like, it is not possible to print out an information such as a document, an image or the like which were formed by using a personal computer, a word processor or the like, by a printer conveniently. Therefore, a specific device, for example, of a photographic system or the like, is required. If the smaller image projection sheet can be used, it is possible to make the whole device small-sized by making the stage small. However, even if a small-sized overhead projector can be obtained, it is not necessarily possible to obtain one which has a good portability for salesmen to conveniently carry it in their bags. Even if the device has a good portability, it is impossible to obtain a clear good projection image when the optical path length from the light source to the projection lens cannot be ensured.

SUMMARY OF THE INVENTION

The feature of the present invention is as follows. The portable overhead projector comprises: a projection unit comprising at least a light source and a projection lens; a stage comprising a Fresnel lens which has a reflecting surface faced to the projection unit; and an arm part for connecting the projection unit with the stage; wherein the projection unit, the stage and the arm part can be folded and have a similar size in plan to one another, and the volume of these members when folded is not larger than that of a length of 184 mm, a width of 135 mm, and a thickness of 58 mm.

According to the present invention, it is possible to form the stage to have about a pocket notebook size (for example, a size of a length of about 130 mm and a width of about 80 mm), and thereby it is possible also to form each of the projection unit and the arm part in approximately the same size as the stage. Accordingly, the portable overhead projector enables extremely miniaturizing the whole device and making it lightweight. Since each member can be folded, it is possible to make the portable overhead projector compact. Further, since the volume of the projector is not larger than that of a width of about 135 mm, a length of about 184 mm, and a thickness of about 58 mm when these members are folded, it is possible for users to conveniently carry such an overhead projector in their bags or the like. Therefore, it is possible to obtain a portable overhead projector having an excellent portability.

In the present invention, because a light source and a projection lens are provided in a projection unit, and a Fresnel lens which has a reflecting surface facing toward the projection unit is provided on the stage, even if the whole device is miniaturized, it is possible to ensure an optical path length from the light source to the projection lens enough. When the thickness of the Fresnel lens is not larger than about 1 mm, even if the optical path length is short, the deviation of the projection image through the Fresnel lens is small and therefore it is possible to obtain a clear and excellent projection image.

According to the present invention, because the image projection sheet having a size not larger than a pocket notebook size (for example, a size of a length of about 130 mm and a width of about 80 mm), is strippably adhered on the ground paper having a size in which a desired image information can be printed or copied by using a printer or a copying machine, even if the image projection sheet is made in a size of about a pocket notebook size, a specific apparatus such as a photographic system or the like is not required. It is possible to make an image projection sheet having a size not larger than that of a pocket notebook easily and conveniently, by printing information, e.g., a document, an image or the like, which was prepared by a known personal computer or a word processor, by using a printer, or by reduction-copying the information by using a copying machine.

According to the invention, because the image projection sheet is formed in a size in which a desired image information can be printed by using a printer or a copying machine, and has a perforation in order to cut it in a designated size similar to about a pocket notebook size (for example, a length of about 130 mm×a width of about 80 mm) after printing, it is possible to make an image projection sheet having a size of about a pocket notebook size easily and conveniently, by printing information, e.g., a document, an image or the like, which was prepared by a known personal computer or a word processor, by using a printer, or by reduction-copying the information by using a copying machine.

According to the invention, because the light source, the projection lens, the cooling fan for cooling the light source are provided in the projection unit, and also the electric circuit part including a driving circuit for driving the light source and the cooling fan is installed in the projection unit, it is unnecessary to perform wiring of circuit cables or the like around members other than the projection unit 1, e.g., the arm part, the stage or the like. Consequently, it is possible to enhance the installation density, to miniaturize the whole device and to make it lightweight.

Further, in the present invention, the light source part comprises a light source and a reflector for reflecting the light from the light source, and is attached to the projection unit through an elastic member so as to permit installation and removal thereof so that the light source part can be moved in a desired direction, and the front periphery portion of the reflector is pressed against a position regulating member by the elastic force of the elastic member to be positioned. Accordingly, even if there are variations in the external size of the light source part, it is possible to set the light axis of the light source can be stably positioned, so that it is possible to install or change the light source part very easily and to make easy-to use.

In the present invention, because the reflecting surface of the Fresnel lens which reflects the light from the light source to gather to the projection lens is formed to be aspherical so that the radius of curvature of the portion in the periphery thereof is smaller than that of the portion near the center thereof, it is possible to surely gather also the light in the vicinity of the periphery in the lights toward the projection lens, which are radiated from the light source part to the Fresnel lens. Thereby, it is possible to improve the utilization efficiency of light, to prevent lowering of the illumination intensity in the vicinity of the periphery of the projection image, and to obtain a projection image having approximately uniform brightness wholly.

BRIEF DESCRIPTION OF THE DRAWINGS

FIGS. 2A, 2B and 2C show folding steps, wherein FIG. 2A is a perspective view of a portable overhead projector in a state of folding the stage in the arm part, FIG. 2B is a perspective view thereof in a state of folding the projection unit in the arm part which contains the stage, and FIG. 2C is a perspective view thereof in a state in which the arm part and the projection unit have been folded in the stage;

FIGS. 3A and 3B show cross-sections of a locking mechanism taken on line 3A—3A of FIG. 1, wherein FIG. 3A is an enlarged cross-sectional view of the locking mechanism in a state of the stage locked and FIG. 3B is an enlarged cross-sectional view of the locking mechanism in a state of the stage unlocked;

FIGS. 6A and 6B show an image projection sheet shown in FIG. 4, wherein FIG. 6A is a plan view showing a state of a sheet for making an image which is an image projection sheet being adhered on a ground paper, and FIG. 6B is a side view thereof;

FIGS. 7A and 7B show states of the light paths in the Fresnel lens, wherein FIG. 7A is an enlarged view showing the state of the light path in a case of using a thin Fresnel lens and FIG. 7B is an enlarged view showing the state of the light path in a case of using a conventional thick Fresnel lens;

FIG. 18A enlarged view of the section 18A—18A of FIG. 18.

FIG. 21 is a plan view showing the interior of the projection unit shown in FIG. 16;

DESCRIPTION OF THE PREFERRED EMBODIMENTS

Hereinafter, a portable overhead projector according to the first embodiment of the present invention will be explained with reference to FIGS. 1–7.

Figure 1:
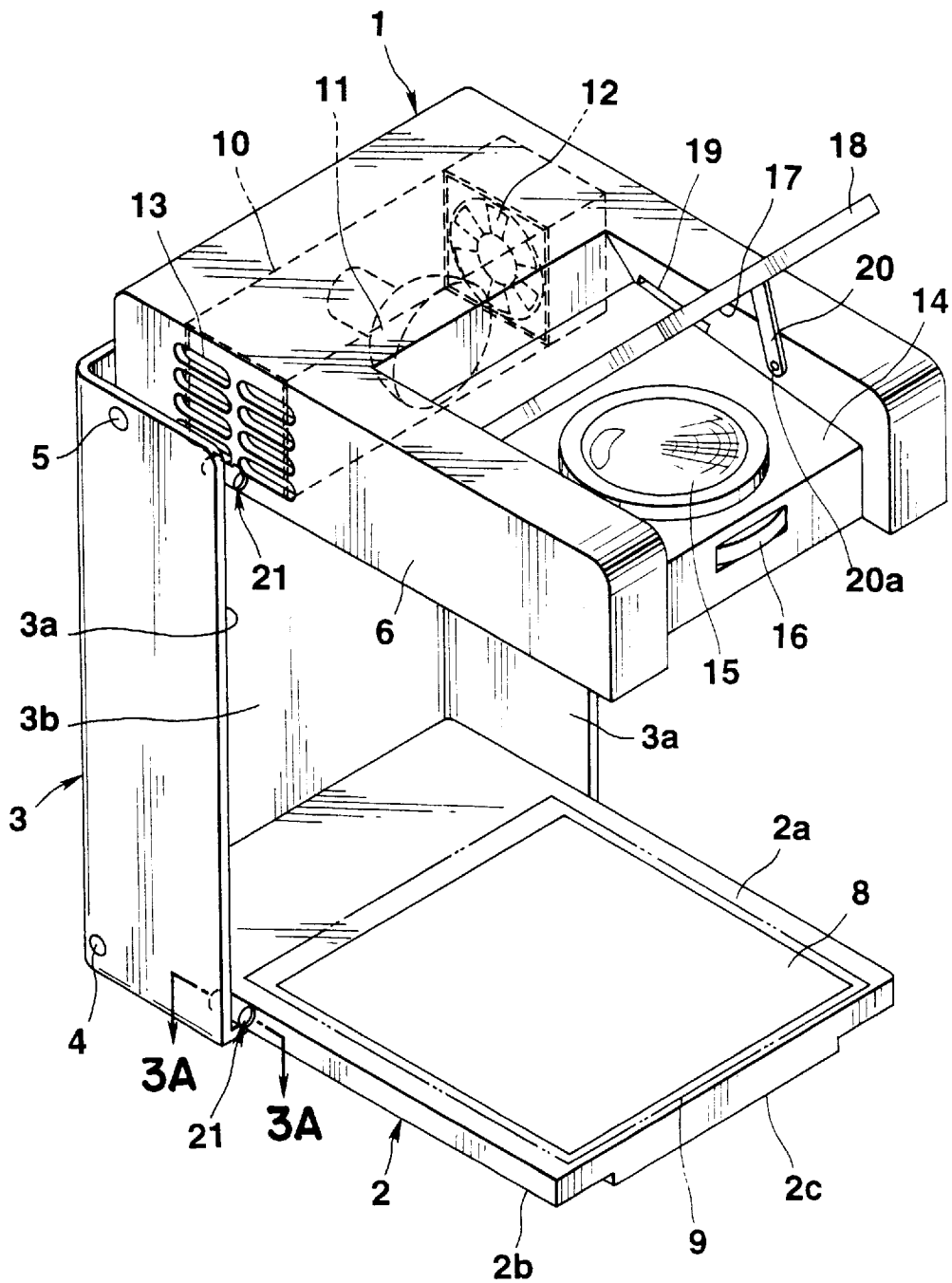
FIG. 1 is a perspective view of a portable overhead projector in a using state, according to a first embodiment of the present invention.
Figure 2A:
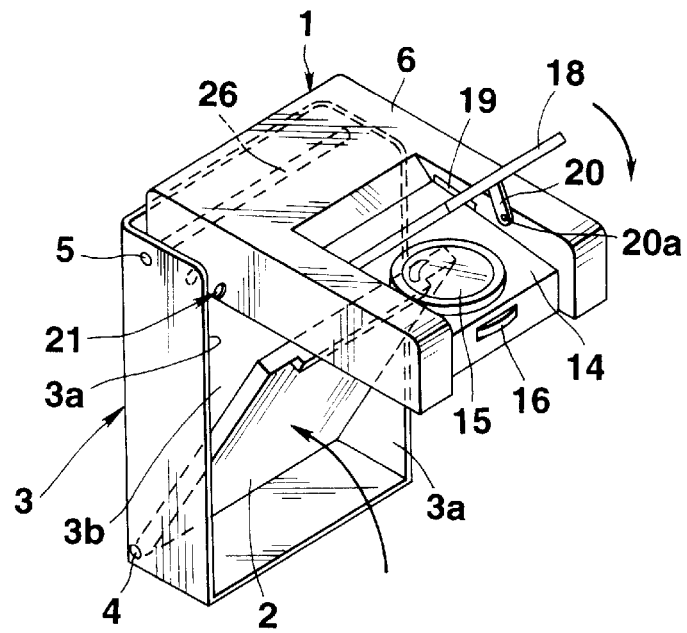
Figure 2B:
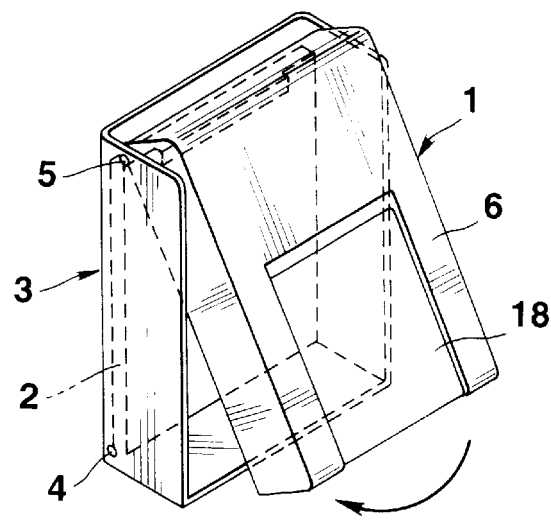
Figure 2C:
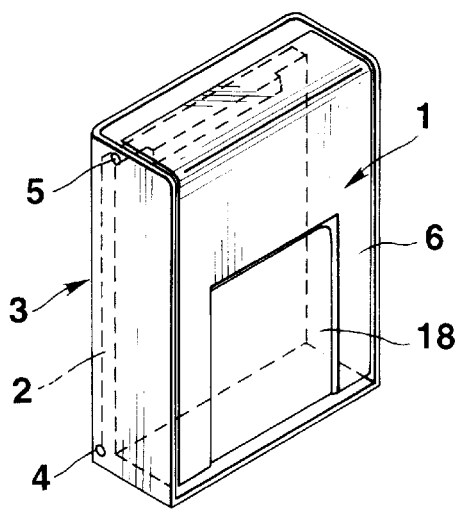

FIG. 1 is a perspective view of a portable overhead projector in a using state, according to a first embodiment of the present invention. FIGS. 2A–2C are perspective views showing folding steps of the portable overhead projector. This portable overhead projector comprises a projection unit 1, a stage 2 and an arm part 3, which are attached to one another so that each part can be folded, and each part has a similar size to one another in plan when each part is folded. The size thereof when folded as shown in FIG. 2C, is approximately the same as that of a bible of about B6 (184×135 mm) in JIS.

That is, the arm part 3 which is made of a synthetic resin or a metal, is formed in an approximately box shape which has openings in the upper side and the right side, as shown in FIG. 1. The size of the arm part 3 is approximately the same as that of a bible of about B6 in JIS, for example, having a width of about 135 mm, a length of about 184 mm and a thickness of about 58 mm. A supporting shaft 4 is spanned between the deep lower portions of the inner facing surfaces 3a and 3a of the arm part 3. An end portion (the left end portion in FIG. 1) of the stage 2 is attached to the supporting shaft 4 so that the stage 2 can be swung around the supporting shaft 4. A supporting shaft 5 is spanned between the deep upper portions of the inner facing surfaces 3a and 3a of the arm part 3. An end portion (the end portion in FIG. 1) of a unit case 6 of the projection unit 1 is attached to the supporting shaft 5 so that the unit case 6 can be swung around the supporting shaft 5.

The stage 2 which is made of a synthetic resin, is formed in a shape of an approximately flat plate the size of which is approximately the same as that of the back inner surface 3b of the arm part 3, as shown in FIG. 1. The stage 2 has a structure so that the stage 2 can be swung on the supporting shaft 4 and can be contained in the inner deep side of the arm part 3, as shown in FIG. 2C, and so that the other end portion, i.e., the right end portion in FIG. 1, can project in a horizontal direction. On the upper surface 2a of the stage 2, that is, on the surface opposite to the inner back surface 3b of the arm part 3, a Fresnel lens 8 having a reflecting surface 7 is provided. On the Fresnel lens 8, an image projection sheet 9 having a size similar to that of a pocket notebook which will be explained later is placed. On the lower surface 2b of the other end portion of the stage 2 projecting from the arm part 3, a leg portion 2c is provided for keeping the upper surface 2a of the stage 2 horizontally when the stage 2 projects from the arm part 3 laterally.

The unit case 6 of the projection unit 1 is made of a synthetic resin and has a shape similar to and slightly smaller than the inner shape of the arm part 3, and thereby can be contained in the arm part 3 together with the stage 2, as shown in FIGS. 1 and 2C. In the projection unit 1, in the side of the supporting shaft 5, that is, in the left side in FIG. 1, a duct 10 for air circulation is provided. In the duct 10 for air circulation, a light source 11 is arranged. In both side surfaces of the unit case 6 corresponding to both ends of the duct 10 for circulation, slit-like through holes 13 for air circulation (one side of which is not shown) are formed. The duct 10 for air circulation is a square cylinder made of a metal and is arranged along the supporting shaft 5. In the dust 10, an opening (not shown) for passing through light is provided at a position corresponding to the light source 11 and a cooling fan 12 is provided in the side of an end thereof. The cooling fan 12 introduces the outside cool air through the through holes 13 in one of the side surfaces of the unit case 6 and discharges inner warm air to the outside through the through holes 13 in the other of the side surfaces, so that the light source 11 is cooled.

In the upper surface side of the other end side, i.e., the right side in FIG. 1, of the unit case 6, a recess portion 14 is formed up to the top end thereof. In the recess portion 14 of the unit case 6, a projection lens 15 is provided to be movable along the optical axis thereof and is exposed from the bottom surface of the recess portion 14. In the recess portion 14 of the unit case 6, a focus adjusting control 16 which can adjust the focus of the projection lens 15 by moving the projection lens 15 along the optical axis thereof is provided. A portion of the focus adjusting control 16 projects from the recess portion 14 toward the top end surface of the unit case.

In the recess portion 14 of the unit case 6, a flat board-shaped cover 18 is attached so that the cover can be stood or laid down. A total reflection mirror 17 is provided on the lower surface of the cover 18 facing to the projection lens 15. That is, the cover 18 is provided with a projecting pin (not shown) at an end (the left lower end in FIG. 1) of each side surface thereof. Each pin is movably inserted in a guide groove 19 which is formed at the deep lower side in the side surface of the unit case in the recess portion 14. To an intermediate position of a side surface of the cover 18, an end (the upper end in FIG. 1) of a supporting lever 20 is swingably attached. The other end 20a (the lower end in FIG. 1) of the supporting lever 20 is swingably attached to a position nearer the front side (the right side in this figure) on the side surface of the unit case in the recess portion 14. The cover 18 can be stood or laid down in the recess portion 14 by the supporting lever 20 rotating around the other end 20a thereof in a clockwise or counterclockwise direction with the pin moving in the guide groove 19. Therefore, the cover 18 covers to protect the projection lens 15 while it is laid down and contained in the recess portion 14, and the cover 18 is supported with an inclination at a predetermined angle by the supporting lever 20 and by the pin being positioned at a positioning portion (not shown) in the guide groove 19 while it is raised.

The stage 2 and the unit case 1 are provided with a locking mechanism 21 for locking these members with respect to the arm part 3 while these members are disposed to project in a horizontal direction from the arm part 3.

Figure 3A:
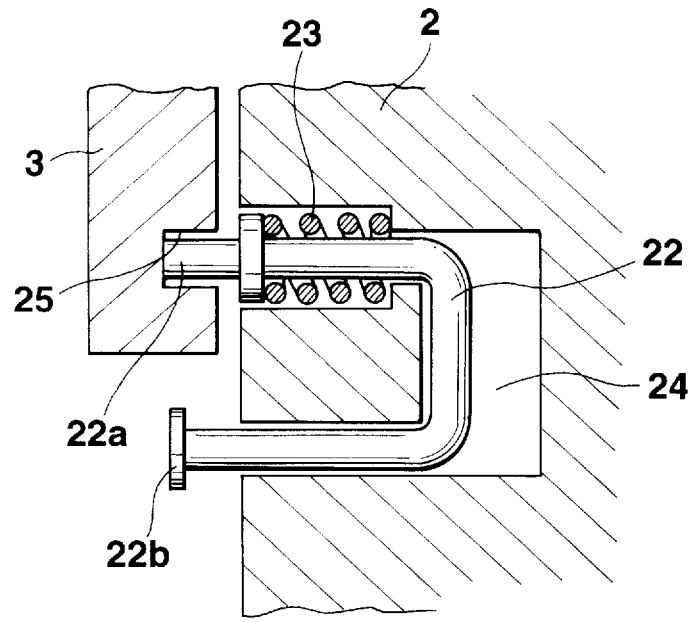
Figure 3B:
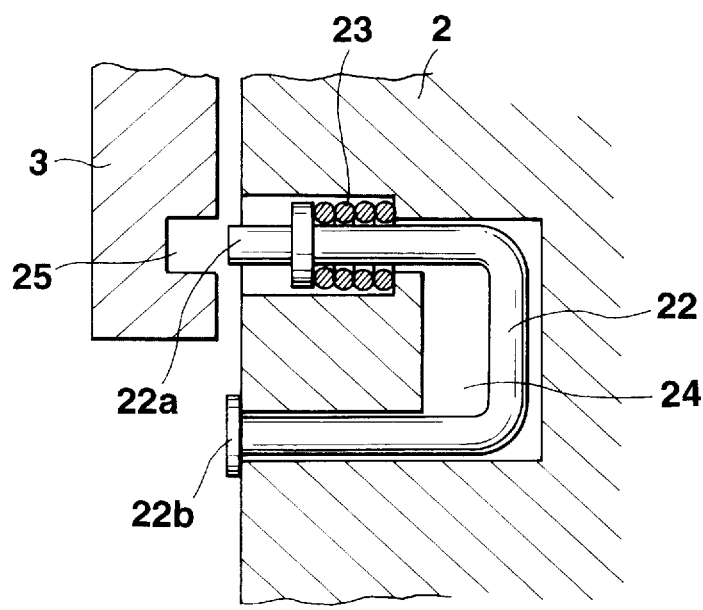

Because the structure of the locking mechanism 21 of the unit case 1 is approximately the same as that of the stage 2, only the structure of the locking mechanism 21 of the stage 2 will be herein explained. The locking mechanisms 21 are provided at both side portions of the stage 2 in the side of the supporting shaft 4. Each locking mechanisms 21 comprises a U-shaped lock pin 22 and a coil spring 23, as shown in FIGS. 3A and 3B. The lock pin 22 is provided with both ends 22a and 22b which are exposed from the side surface of the stage, and is disposed so as to slidably move in the direction for the both ends 22a and 22b to go in and out of a cavity 24. The coil spring 23 is disposed on the periphery of one end side 22a of the lock pin 22 in the cavity 24 and energizes the lock pin 22 in a direction for the both ends 22a and 22b to go out.

In the locking mechanisms 21, when the stage 2 projects in a horizontal direction from the arm part 3, the one end 22a of the lock pin 22 is pushed out by the spring force according to the coil spring 23 and is inserted into a positioning hole 25 which is formed in the inner side of the arm part 3, as shown in FIG. 3A. The locking mechanisms 21 can be unlocked by pushing the other end 22b of the lock pin 22 which projects out of the arm part 3 against the spring force according to the coil spring 23 to release the other end 22b from the positioning hole 25 of the arm part 3, as shown in FIG. 3B.

On the supporting shaft 5 on which the unit case 6 is attached, a torsion-bar spring 26 is attached in order to energize the unit case 6 in a direction in which the unit case 6 is pushed out of the arm part 3, as shown in FIG. 2A.

Next, light paths and optical elements on the light paths, in the portable overhead projector will be explained with reference to FIG. 4.

The light source 11 comprises a halogen lamp 30 and a reflector 31. The halogen lamp 30 is disposed at the focal point of the reflector 31 or in the vicinity of it, in order to gather the light from the halogen lamp 30 into the side of a total reflection mirror 32 by the reflector 31. In this embodiment, for example, a halogen lamp 30 of 130 W under 100 V is used. The reflecting surface of the reflector 31 has a shape so that the focal length fR thereof is about 43 mm, and is formed with a dichroic mirror through which infrared radiation passes to reduce heating according to the exothermic reaction of the halogen lamp 30 and which reflects lights other than infrared radiation. The total reflection mirror 32 is arranged to incline at a predetermined angle with respect to a light axis 33 of the light source 11 in order to reflect the light gathered by the reflector 31 toward the Fresnel lens 8 on the stage 2. In this case, the length L1 between the light axis 33 of the light source 11 and the upper surface of the Fresnel lens 8 is set to about 183 mm.

Figure 5:
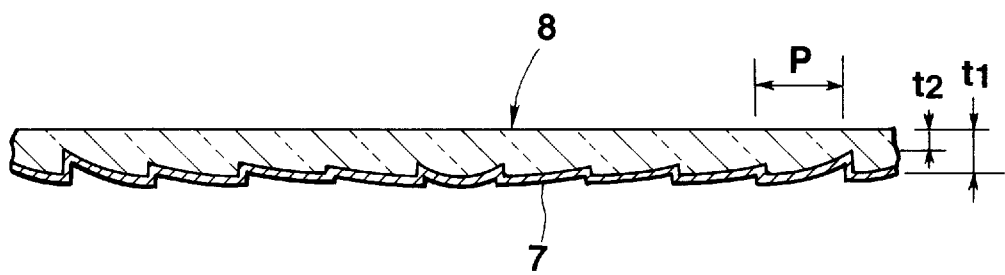
FIG. 5 is an enlarged cross-sectional view of a Fresnel lens shown in FIGS. 1 and 4.

The Fresnel lens 8 is for gathering the incident lights onto the projection lens 15. The upper surface of the Fresnel lens 8 is formed in a plane and the lower surface thereof is formed in the Fresnel surface, as shown in FIG. 5. On the lower Fresnel surface, a reflecting surface 7 is formed as a body by sputtering of aluminum. The Fresnel lens 8 is made from an acrylic sheet and has a thickness not more than 1 mm, preferably a total thickness t1 of about 0.4 mm, a cut lens thickness t2 of about 0.2 mm, and a pitch of the Fresnel rings of about 0.35 mm. The size of the Fresnel lens 8 is about 100×100 mm and the focal length f1 is set to about −100 mm. Because even if the total reflection mirror 32 comes extremely near the projection lens 15, the length L1 between the light axis 33 of the light source 11 and the upper surface of the Fresnel lens 8 is set to about 183 mm, the angle q1 between the incident light and the outgoing light on the upper surface of the Fresnel lens 8 is set to about 14°.

The projection lens 15 is for enlargedly projecting an image of the image projection sheet 9 placed on the Fresnel lens 8, on a screen (not shown) through the total reflection mirror 17. In the projection lens 15, the focal length f2 is set to about 165 mm, the F-number is set to about 3.5, the projection length is set to 1.5–3.0 m, and the magnification is set to 7–15.0. The total reflection mirror 17 of the cover 18 is supported by the recess portion 14 to incline at a predetermined angle so that the light axis 35 of the reflection light is not just in the horizontal direction, but tilts a little toward the upper direction.

The image projection sheet 9 which is placed on the Fresnel lens 8 of the stage 2 comprises; a ground paper 36 which has a size similar to that of a postcard corresponding to about A6 size (105 mm×149 mm) in JIS, and on which printing can be performed by a printer or duplication can be performed by a copying machine; and a transparent image making sheet on which an image is formed and which is strippably adhered on the ground paper 36 and has a size similar to that of a pocket notebook (for example, 130 mm×80 mm), as shown in FIGS. 6A and 6B. In the central portion of the image projection sheet 9, an image making region 37 having a size of about 90 mm×60 mm is formed. In the vicinity of a longitudinal side of the image projection sheet 9, a plurality of holes 38 for a binder are formed in a line along the side at approximately equal spaces. Each hole 38 for a binder has a cut 39 connecting the hole 38 with the end of the side. The cuts 39 are for permitting installation and removal of the image projection sheet 9 without opening the binder.

According to such a portable overhead projector, because the image making sheet having about a pocket notebook size is strippably adhered on the ground paper having about a postcard size, such an image making sheet having about a pocket notebook size does not require a specific apparatus such as a photographic system or the like. It is possible to make an image projection sheet 9 having a size not larger than that of a pocket notebook easily and conveniently, by printing information, e.g., a document, an image or the like, which was prepared by a known personal computer or a word processor, by using a printer, or by reduction-copying the information by using a copying machine.

As described above, by using an image projection sheet 9 having about a pocket notebook size, it is possible to form the stage 2 in a size of a pocket notebook, for example, in a size of a bible corresponding to about B6 size in JIS. Therefore, it is possible to form each of the projection unit 1 and the arm part 3 in approximately the same size as the stage 2. Accordingly, the portable overhead projector enables extremely miniaturizing the whole device and making it lightweight.

According to such a portable overhead projector, because the projection unit 1 and the stage 2 are attached to the arm part 3 so that each of these members can swing by the supporting shaft 4 or 5, it is possible to fold the projection unit 1 and the stage 2 and to contain these members in the arm part 3. In this case, first, the locking mechanism 21 of the stage 2 is unlocked, and the stage 2 is rotated on the supporting shaft 4 to be folded and contained in the arm part 3, as shown in FIG. 2A. Next, after the locking mechanism 21 of the projection unit 1 is unlocked, the projection unit 1 is rotated on the supporting shaft 5, as shown in FIG. 2B, and the projection unit 1 is folded on the folded stage 2 and contained in the arm part 3, as shown in FIG. 2C. Thereby, the whole device comes to be compact. Since the arm part 3 has about a bible size corresponding to about B6 size in JIS, the size of the folded whole device comes to be about a bible size corresponding to about B6 size. It is possible for user, e.g., salesmen or the like, to conveniently carry such an overhead projector in their bags. According to the embodiment, it is possible to obtain a portable overhead projector having an excellent portability.

Figure 7A:
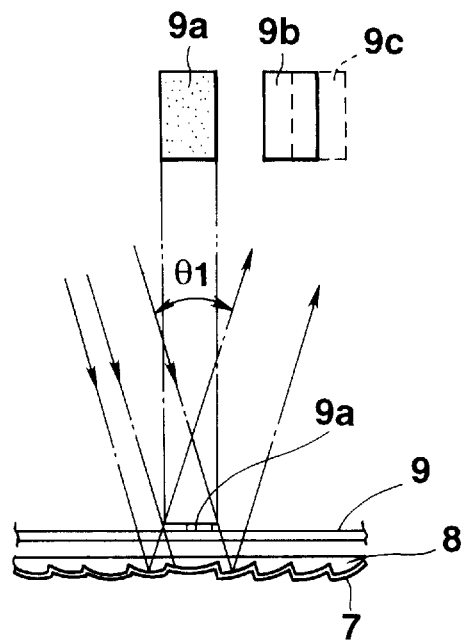

In order to use such a portable overhead projector, in contrast with the above-described operation, first, the projection unit 1 is rotated to project in a horizontal direction from the arm part 3 and the projection unit 1 is locked to the arm part 3 by the locking mechanism 21. Thereafter, the stage 2 is rotated to project in a horizontal direction from the arm part 3 and the stage 2 is locked to the arm part 3 by the locking mechanism 21. After the stage 2 and the arm part 3 are placed on a table, the cover 18 of the projection unit 1 is raised up and supported by the supporting lever 20 to incline at a predetermined angle shown in FIG. 1. Then, the image projection sheet 9 is placed on the Fresnel lens 8 of the stage 2 and the halogen lamp 30 of the light source 11 is lighted up. The lights from the halogen lamp 30 is gathered by the reflector 31 and is totally reflected toward the image projection sheet 9 by the total reflection mirror 32, as shown in FIG. 4. The light irradiated to an image portion 9a out of the lights irradiated to the image projection sheet 9 is cut off by the image portion 9a, and the lights irradiated to portions other than the image portion 9a transmits through the image projection sheet 9 to enter the Fresnel lens 8, as shown in FIG. 7A. The incident lights is reflected by the reflecting surface 7 of the Fresnel lens 8. The reflected lights from the portions other than the image portion 9a is converged toward the projection lens 15 by the Fresnel lens 8. Thereby, the image of the image projection sheet 9 is projected on the screen as an enlarged projection image through the projection lens 15 and the total reflection mirror 17 of the cover 18.

In the portable overhead projector, when the lights irradiated to the image projection sheet 9 is converged toward the projection lens 15 by the Fresnel lens 8, even if the total reflection mirror 32 comes extremely near the projection lens 15, the angle 1 between the incident light and the outgoing light on the light axis 34 on the upper surface of the Fresnel lens 8 becomes large, e.g., about 14 because the length L1 between the light axis 33 of the light source 11 and the upper surface of the Fresnel lens 8 is short, e.g., about 183 mm. However, because the thickness of the Fresnel lens 8 is small, e.g., not more than 1 mm, it is possible to obtain a good projection image. The reason of this is as follows.

In a conventional device having a large external form, because the length L1 between the light axis 33 of the light source 11 and the upper surface of the Fresnel lens 8 can be set longer, it is possible to make the angle 1 between the incident light and the outgoing light on the upper surface of the Fresnel lens 8 small to the extent of about 5–7, by making the distance between the total reflection mirror 32 and the projection lens 15 constant. Accordingly, even if the thickness of the Fresnel lens 8 is large, the deviation of the projected image in the vertical direction is hardly noticeable. However, when the whole device becomes small, such as the device of the embodiment, the length L1 between the light axis 33 of the light source 11 and the upper surface of the Fresnel lens 8 becomes short, e.g., about 183 mm, accordingly, the angle 1 between the incident light and the outgoing light on the upper surface of the Fresnel lens 8 becomes large, e.g., about 14. Therefore, when the thickness of the Fresnel lens 8 is large, the deviation of the projected image in the vertical direction is noticeable, as follows.

Figure 7B:
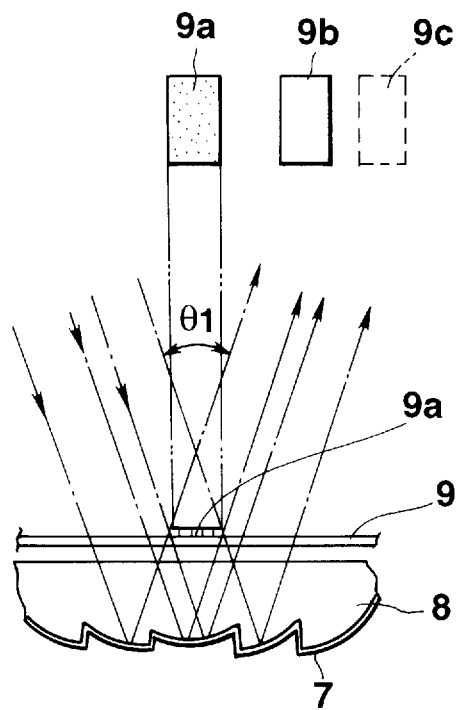

When the thickness of the Fresnel lens 8 is large, because the image portion 9a of the image projection sheet 9 is apart from the reflection surface 7 of the Fresnel lens 8, as shown in FIG. 7B, a part of the light irradiated from the total reflection mirror 32 to the image projection sheet 9 is cut off by the image portion 9a of the image projection sheet 9 to form a first projection image 9b at a position illustrated by a solid line in FIG. 7B. A part of the lights which were not cut off by the image portion 9a and reached to the reflection surface 7 to be reflected thereby, form a second projection image 9c at a position illustrated by a dotted line in FIG. 7B. Because these first and second projection images 9b and 9c are apart from each other without overlapping, the projection images projected by the projection lens 15 form a double image in which the first and second projection images are deviated in a vertical direction. However, when the thickness of the Fresnel lens 8 is small to the extent not larger than about 1 mm, such as the present embodiment, because the image portion 9a of the image projection sheet 9 is near the reflection surface 7 of the Fresnel lens 8, the first projection image 9b is formed by the lights irradiated from the total reflection mirror 32 to the image projection sheet 9 at a position illustrated by a solid line in FIG. 7A. The second projection image 9c is formed by the lights which were not cut off by the image portion 9a and reached to the reflection surface 7 to be reflected thereby, at a position illustrated by a dotted line in FIG. 7A. The deviation of these first and second projection images 9b and 9c is small and these projection images mostly overlap. Therefore, when these first and second projection images 9b and 9c are enlargedly projected on the screen, these first and second projection images 9b and 9c can be visually recognized in almost one united body. That is, a clearer projection image is obtained.

Further, in the portable overhead projector, because a light source 11 is arranged in the duct 10 for air circulation, and the outside cool air is compulsorily introduced in the duct 10 for circulation by a cooling fan 12, the light source 11 can be surely cooled. Thereby, it is possible to prevent the unit case 6 from thermal deformation due to heating from the halogen lamp 30. Since the duct 10 for circulation is made of a metal, it is possible to securely protect the light source 11 and to function as a reinforcement for the unit case 6.

The Fresnel lens 8 in the above-described first embodiment has a total thickness t1 of about 0.4 mm, a cut lens thickness t2 of about 0.2 mm, and a pitch p of the Fresnel rings of about 0.35 mm. However, the smaller than 0.35 mm the pitch p of the Fresnel rings is, the thinner than 0.4 mm the total thickness t1 can be. Accordingly, it is possible to restrain the deviation of the projection image even if the length L1 between the light axis 33 of the light source 11 and the upper surface of the Fresnel lens 8 is shorter than that of the first embodiment. In the Fresnel lens 8 in the above-described first embodiment, the reflecting surface 7 is formed on the lower Fresnel surface as one body, by sputtering of aluminum. However, it is not necessarily indispensable to form the reflecting surface 7 as one body. A reflecting plate can be provided under the Fresnel lens 8.

In the above-described first embodiment, the lights from the light source 11 are reflected toward the Fresnel lens 8 through the total reflection mirror 32. However, the lights from the light source 11 can be gathered to the Fresnel lens 8 directly.

Further, in the above-described first embodiment, when the image of the image projection sheet 9 is enlargedly projected through the projection lens 15, the direction for projection is changed by the total reflection mirror 17 of the cover 18. However, it is not necessarily indispensable to change the direction for projection through the total reflection mirror 17. For example, the image can be enlargedly projected through the projection lens 15 directly by placing the arm part 3 on the table so that the projection unit 1 and the stage 2 stand vertically.

Next, a portable overhead projector according to the second embodiment of the present invention will be explained with reference to FIGS. 8–11. In these Figures, the same numbers are attached to the portions corresponding to those of the first embodiment, and therefore an explanation for the portions is omitted.

Figure 8:
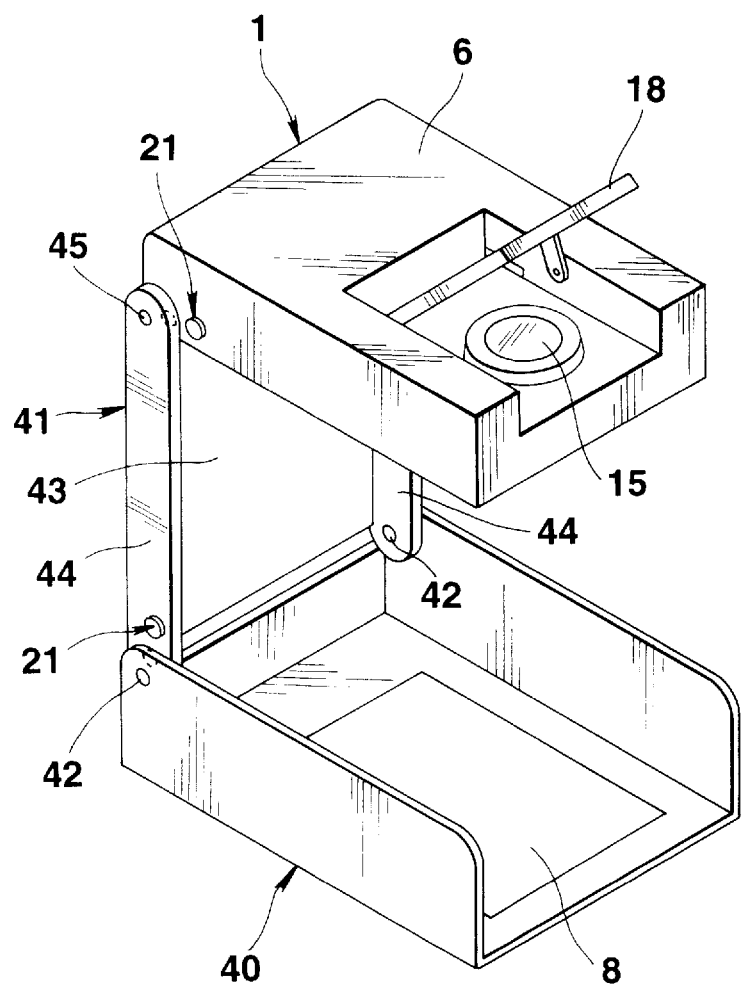
FIG. 8 is a perspective view of a portable overhead projector in a using state, according to a second embodiment of the present invention.
Figure 11:
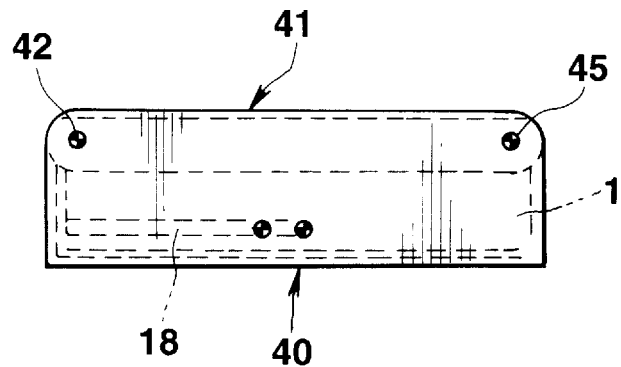
FIG. 11 is a side view showing a state of the arm part which contains the folded projection unit, being folded in the stage.

This portable overhead projector comprises a projection unit 1, a stage 40, and an arm part 41, each of which can be folded, as shown in FIG. 8. The size thereof when these portions are folded to contain in the stage 40, as shown in FIG. 11, is approximately the same as that of a bible of about B6 in JIS.

The stage 40 which is made of a synthetic resin or a metal, is formed in a shape of an approximate box which has opened upper and right sides, as shown in FIG. 8, and has a size of a bible corresponding to about B6 size in JIS, e.g., of a width of about 130 mm, a length of about 180 mm, and a thickness (height) of about 50 mm. On the bottom surface of the stage 40, a Fresnel lens 8 having a reflecting surface 7 on the lower surface thereof is provided, similarly to the first embodiment. The Fresnel lens 8 is formed in a size in which an image projection sheet 9 having a size similar to that of a pocket notebook can be placed, e.g., about 100 mm×100 mm, similarly to the first embodiment.

Figure 9:
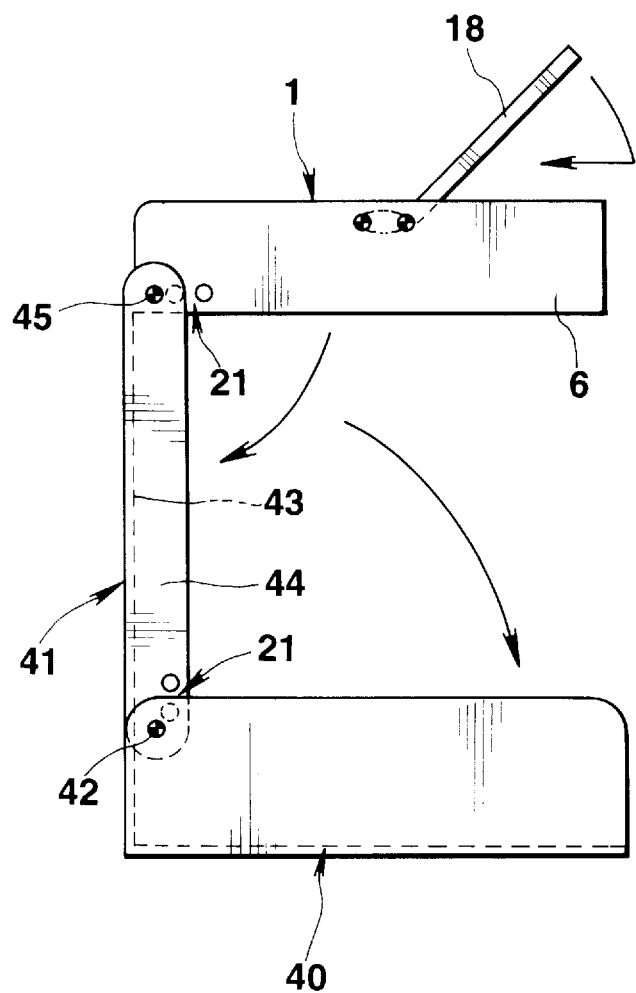
FIG. 9 is a side view of FIG. 8.

The arm part 41 is made of a synthetic resin, and comprises a flat plate portion 43 having a size corresponding to the bottom surface of the stage 40, and side plates 44 provided at both side ends of the flat plate portion 43, as shown in FIG. 8. The side plates 44 are attached to the upper left side ends of the inner surfaces of side plates of the stage 40 so that the side plates can be swung around supporting pins 42. The arm part 41 has a structure so that the arm part 41 can stand upward perpendicularly to the stage 40, as shown in FIG. 9, by swinging around the supporting pins 42, and can be contained in the upper portion of the stage 40, as shown in FIG. 11.

Figure 10:
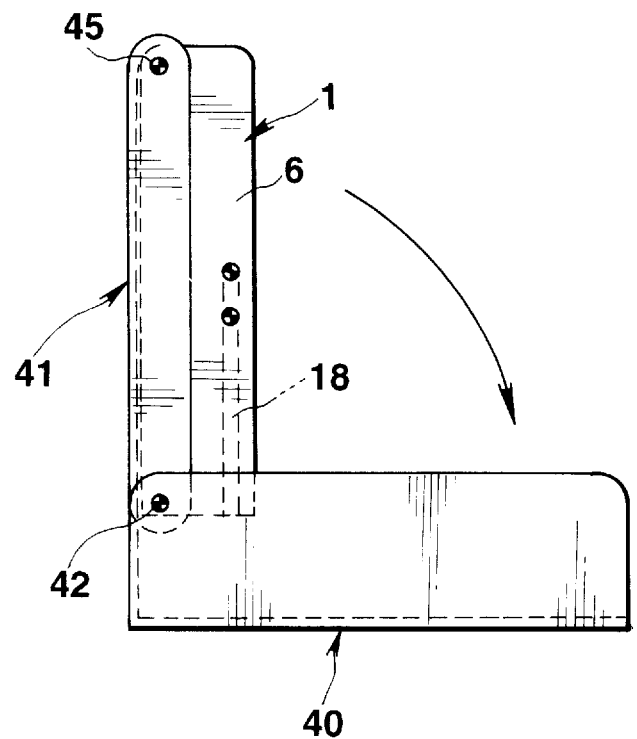
FIG. 10 is a perspective view showing a state of the projection unit being folded in the arm part.

In the unit case 6 of the projection unit 1, a light source, a duct 10 for air circulation, a projection lens 15 and the like are provided, similarly to the first embodiment. In the recess portion 14 of the unit case 6, a cover 18 having a total reflection mirror is attached so that the cover can be stood and laid down. The unit case 6 is swingably attached to a supporting shaft 45 which is spanned between the other ends (the upper ends in FIGS. 8 and 9) of the side plates 44. When the arm part 41 stands perpendicularly, the projection unit 1 can be in a horizontal state, as shown in FIG. 9, and can be also in a vertical state in which the projection unit 1 is in contact with the flat plate portion 43 closely, as shown in FIG. 10, by swinging around the supporting shaft 45. In this case, the unit case 6 has sizes of upper and lower surfaces which are approximately the same as that of the inner surface of the flat plate portion 43, and a thickness smaller than that of the stage 40.

The arm part 41 is provided with a locking mechanism 21 for locking these portions with respect to the stage 40, similarly to the first embodiment, while the arm part 41 stands vertically on the stage 40. Similarly, the unit case 6 is provided with a locking mechanism 21 for locking the unit case 6 with respect to the arm part 41, while the unit case 6 is disposed to project in a horizontal direction.

According to such a portable overhead projector, by using an image projection sheet 9 having about a pocket notebook size, it is possible to form the stage 40 in a size of a pocket notebook, for example, in a size of a bible corresponding to about B6 size in JIS. Therefore, it is possible to form each of the projection unit 1 and the arm part 41 in approximately the same size as the stage 40. Accordingly, the portable overhead projector enables extremely miniaturizing the whole device and making it lightweight.

In particular, in such a portable overhead projector, the unit case 6 of the projection unit 1 is attached to the arm part 41 so that the unit case 6 can swing around the supporting shaft 45, and the arm part 41 is attached to the stage 40 so that the arm part 41 can swing around the supporting pins 42. Therefore, first, by unlocking the locking mechanism 21 of the unit case 6 to swing the unit case 6, it is possible to bring the unit case 6 in contact with the inner surface of the flat plate portion 43 closely, as shown in FIG. 10. Further, by unlocking the locking mechanism 21 of the arm part 41 to swing the arm part 41 which has the folded unit case 6, it is possible to fold the arm part 41 with the unit case 6 in the stage 40 and to contain these members in the stage 40, as shown in FIG. 11. Since the stage 40 has about a bible size corresponding to about B6 size in JIS, the size of the folded whole device comes to be about a bible size corresponding to about B6 size. Therefore, it is possible for user, e.g., salesmen or the like, to conveniently carry such an overhead projector in their bags, similarly to the first embodiment. According to the embodiment, it is possible to obtain a portable overhead projector having an excellent portability. Because the projection unit 1 is covered by the stage 40 and the arm part 41 in a state of each member being folded, it is possible to protect the projection unit 1 from external shocks by the stage 40 and the arm part 41.

In order to use such a portable overhead projector, in contrast with the above-described operation, first, after the stage 40 is placed on a table, the arm part 41 is swung to stand upward vertically on the stage 40, as shown in FIG. 10, and the arm part 41 is locked to the stage 40 by the locking mechanism 21. Thereafter, the projection unit 1 is swung with respect to the arm part 41 to project in a horizontal direction, as shown in FIG. 9, and the projection unit 1 is locked to the arm part 41 by the locking mechanism 21. Thereafter, the cover 18 of the projection unit 1 is raised up and supported to incline at a predetermined angle shown in FIG. 9. Then, the image projection sheet 9 is placed on the Fresnel lens 8 of the stage 2 and the halogen lamp 30 of the light source 11 is lighted up. Accordingly, the image of the image projection sheet 9 can be projected on the screen as an enlarged projection image, similarly to the first embodiment. In this case, the portable overhead projector can be set by swinging the arm part 41 and the projection unit 1 in this order, in a state of the stage 40 containing the folded projection unit 1 and arm part 41 being placed on the table. Therefore, the embodiment provides a good working efficiency in comparison with the first embodiment.

Next, a portable overhead projector according to the third embodiment of the present invention will be explained with reference to FIGS. 12–15. In this case, the same numbers are attached to the portions corresponding to those of the first embodiment, and therefore an explanation for the portions is omitted.

Figure 12:
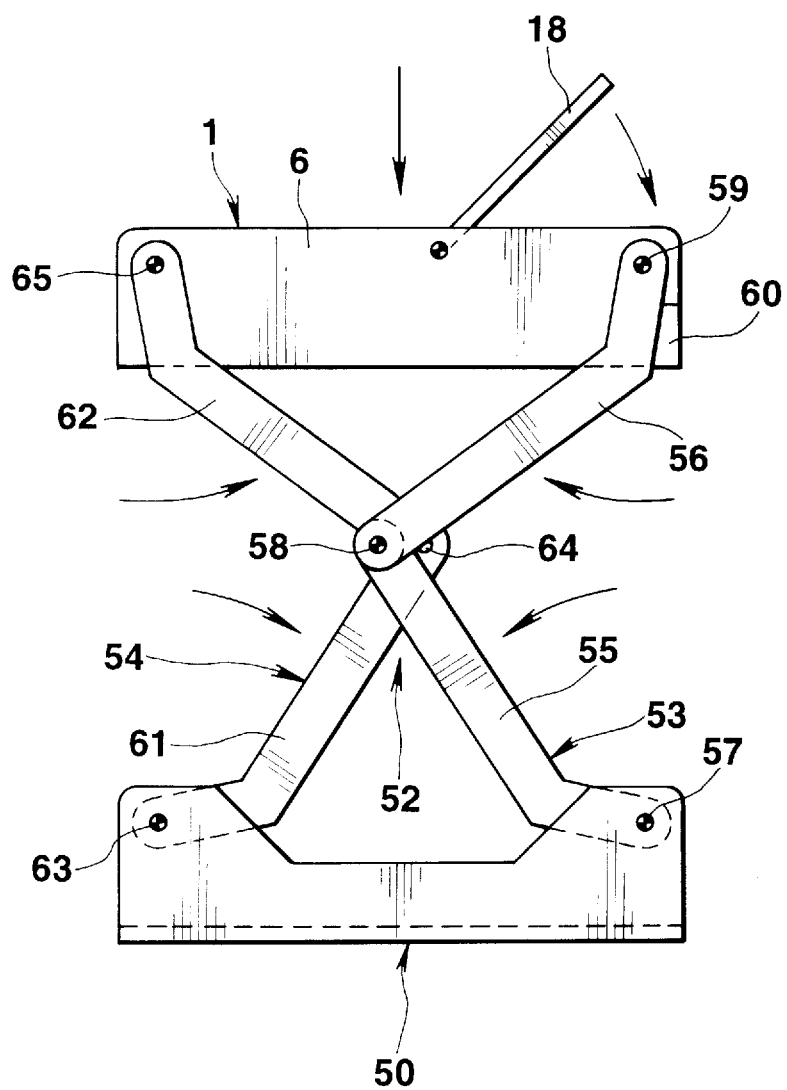
FIG. 12 is a side view of a portable overhead projector in a using state, according to a third embodiment of the present invention.
Figure 15:
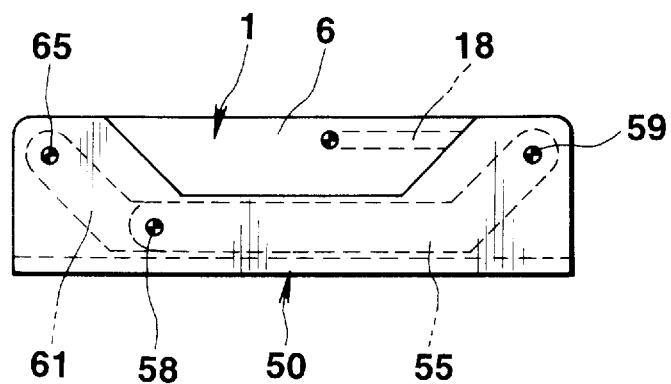
FIG. 15 is a side view showing a state of the projection unit which has been further pushed down to be contained in the stage.

This portable overhead projector comprises a projection unit 1, a stage 50, and an arm part 51, as shown in FIG. 12. The projection unit 1 and the stage 50 are connected through the arm part 51 which can be expanded and contracted. The projection unit 1 can be contained in the stage 50 by contraction of the arm part 51, as shown in FIG. 15. The total size of the portable overhead projector when these portions are folded to contain in the stage 50, is approximately the same as that of a bible of about B6 in JIS.

The stage 50 which is made of a synthetic resin or a metal, and of which the upper side and both sides are opened, has a U-shaped section, as shown in FIG. 12. The stage 50 has a size of about a bible corresponding to about B6 siz in JIS, e.g., of a width of about 135 mm, a length of about 184 mm, and a thickness (height) of about 58 mm. On the bottom surface of the stage 50, a Fresnel lens having a reflecting surface on the lower surface thereof is provided, similarly to the first embodiment. The Fresnel lens is formed in a size in which an image projection sheet having a size similar to that of a pocket notebook can be placed, e.g., about 100 mm×100 mm, similarly to the first embodiment.

In the unit case 6 of the projection unit 1, a light source, a duct for air circulation, a projection lens and the like are provided. In the recess portion 14 of the unit case 6, a cover 18 having a total reflection mirror is attached so that the cover can be stood and laid down. The unit case 6 has a size to be contained in the stage 50.

Figure 13:
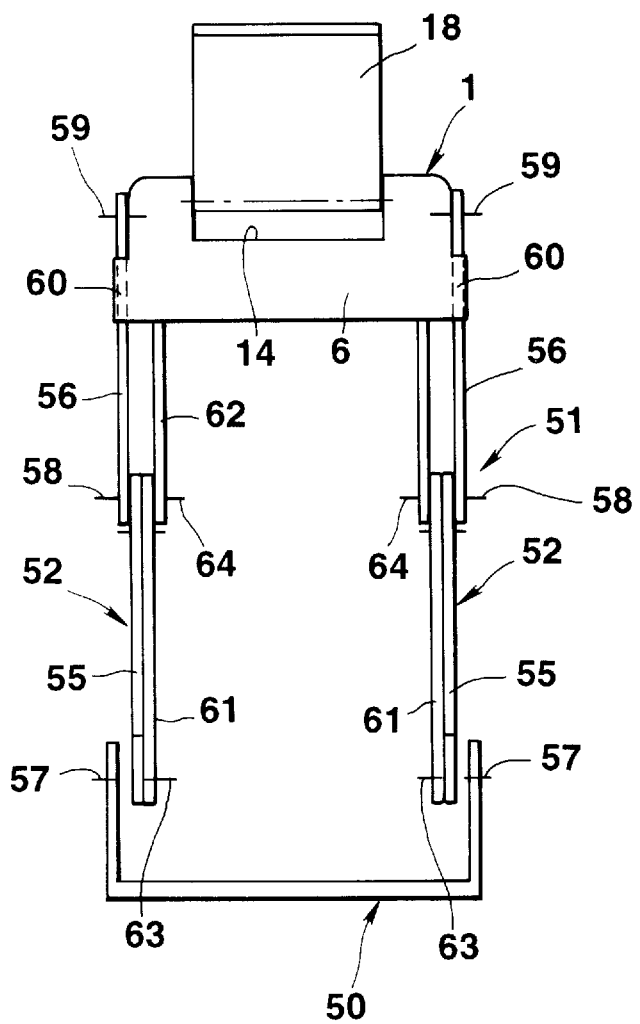
FIG. 13 is a front view of FIG. 12.

The arm part 51 has a pair of right and left linkages 52 which is made of a synthetic resin or a metal, as shown in FIGS. 12 and 13. The linkage 52 comprises a first link member 53 which is attached to the right side of the stage 50 shown in FIG. 12, and a second link member 54 which is attached to the left side of the stage 50.

The first link member 53 comprises a lower arm 55 the lower portion of which is bent a little, and an upper arm 56 the upper portion of which is bent a little, as shown in FIG. 12. The lower end of the lower arm 55 is attached to the right inner surface of the stage 50 to be able to swing around the pin 57, the upper end of the lower arm 55 is attached to the lower end of the upper arm 56 to be able to swing around the pin 58, and the upper end of the upper arm 56 is attached to the external right side surface of the unit case 6 to be able to swing around the pin 59. In a state of the unit case 6 lifted up above the stage 50, the whole first link member 53 has a "<"-shape, as shown in FIG. 12, and the upper end portion of the upper arm 56 comes into contact with a stopper for positioning the unit case 6, so that the first link member 53 supports the unit case 6. In a state of the unit case 6 contained in the stage 50, the lower arm 55 and the upper arm 56 come to overlap to each other horizontally so that the pin 57 at the lower end portion of the lower arm 55 corresponds to the pin 59 at the upper end portion of the upper arm 56, as shown by a dotted line in FIG. 15.

On the other hand, the second link member 54 has a symmetrical structure to the first link member 53. That is, in the second link member 54, the lower end of the lower arm 61 is attached to the left inner surface of the stage 50 to be able to swing around a pin 63, the upper end of the lower arm 61 is attached to the lower end of the upper arm 62 to be able to swing around a pin 64, and the upper end of the upper arm 62 is attached to the external left side surface of the unit case 6 to be able to swing around a pin 65. In a state of the unit case 6 lifted up above the stage 50, the whole second link member 54 has a ">"-shape, as shown in FIG. 12. In a state of the unit case 6 contained in the stage 50, not only the lower arm 61 and the upper arm 62 but also the first link member 53 come to overlap to one another horizontally so that the pin 63 at the lower end portion of the lower arm 61 corresponds to the pin 65 at the upper end portion of the upper arm 62, as shown by a dotted line in FIG. 15.

According to such a portable overhead projector, by using an image projection sheet having about a pocket notebook size, it is possible to form the tage 50 in a size of a pocket notebook, for example, in a size of a bible corresponding to about B6 size in JIS, similarly to the first embodiment. Therefore, it is possible to form each of the projection unit 1 and the arm part 51 in approximately the same size as the stage 50. Accordingly, the portable overhead projector enables extremely miniaturizing the whole device and making it lightweight.

In particular, in such a portable overhead projector, because the unit case 6 of the projection unit 1 is attached to the stage 50 through the arm part 51 which can be expanded and contracted, it is possible to contain the projection unit 1 together with the arm part 51 in the stage 50, by folding each linkage 52 of the arm part 51 to contract, as shown in FIG. 15. Since the stage 50 has about a bible size corresponding to about B6 size in JIS, the size of the folded whole device comes to be about a bible size corresponding to about B6 size. It is possible for user, e.g., salesmen or the like, to conveniently carry such an overhead projector in their bags, and it is possible to obtain a portable overhead projector having an excellent portability, similarly to the first embodiment.

Figure 14:
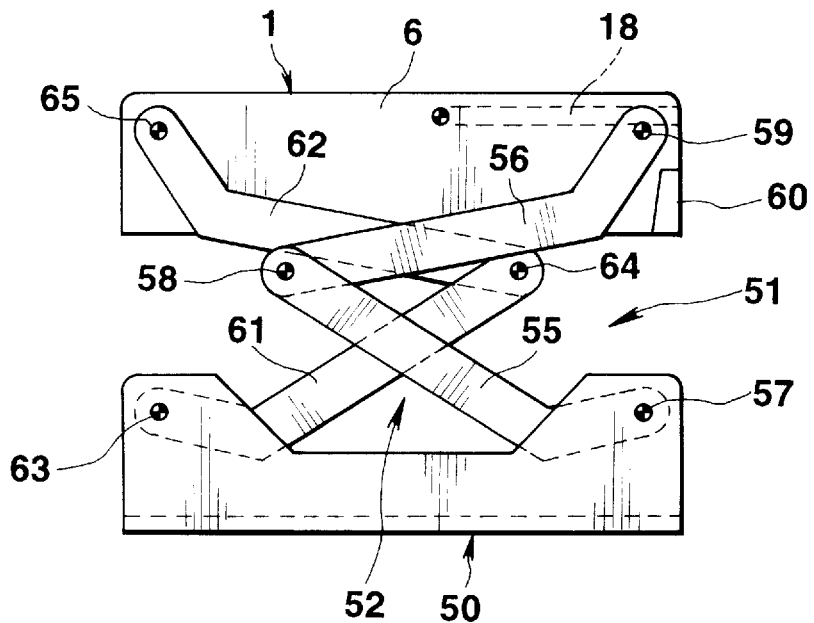
FIG. 14 is a side view showing an intermediate state of the projection unit which is pushed down by contracting the arm part.

In order to use such a portable overhead projector, in contrast with the above-described operation, first, after the stage 50 is placed on a table, when the projection unit 1 is lifted up from the stage 50, as shown in FIG. 14, the linkage 52 of the arm part 51 is expanded upward and the projection unit 1 is horizontally supported above the stage 50 by the arm part 51, as shown in FIG. 12. In this state, the cover 18 of the projection unit 1 is raised up and supported to incline at a predetermined angle shown in FIG. 12. Then, an image projection sheet 9 is placed on the Fresnel lens 8 of the stage 50 and the light source is lighted up. Thereby, the image of the image projection sheet can be projected on the screen as an enlarged projection image, similarly to the first embodiment. In this embodiment, because the projection unit 1 can be horizontally supported above the stage 50 by expanding the arm part 51 through lifting up the projection unit 1, it is possible to provide a good working efficiency, similarly to the second embodiment.

Hereinafter, a portable overhead projector according to the fourth embodiment of the present invention will be explained with reference to FIGS. 16–38.

Figure 16:
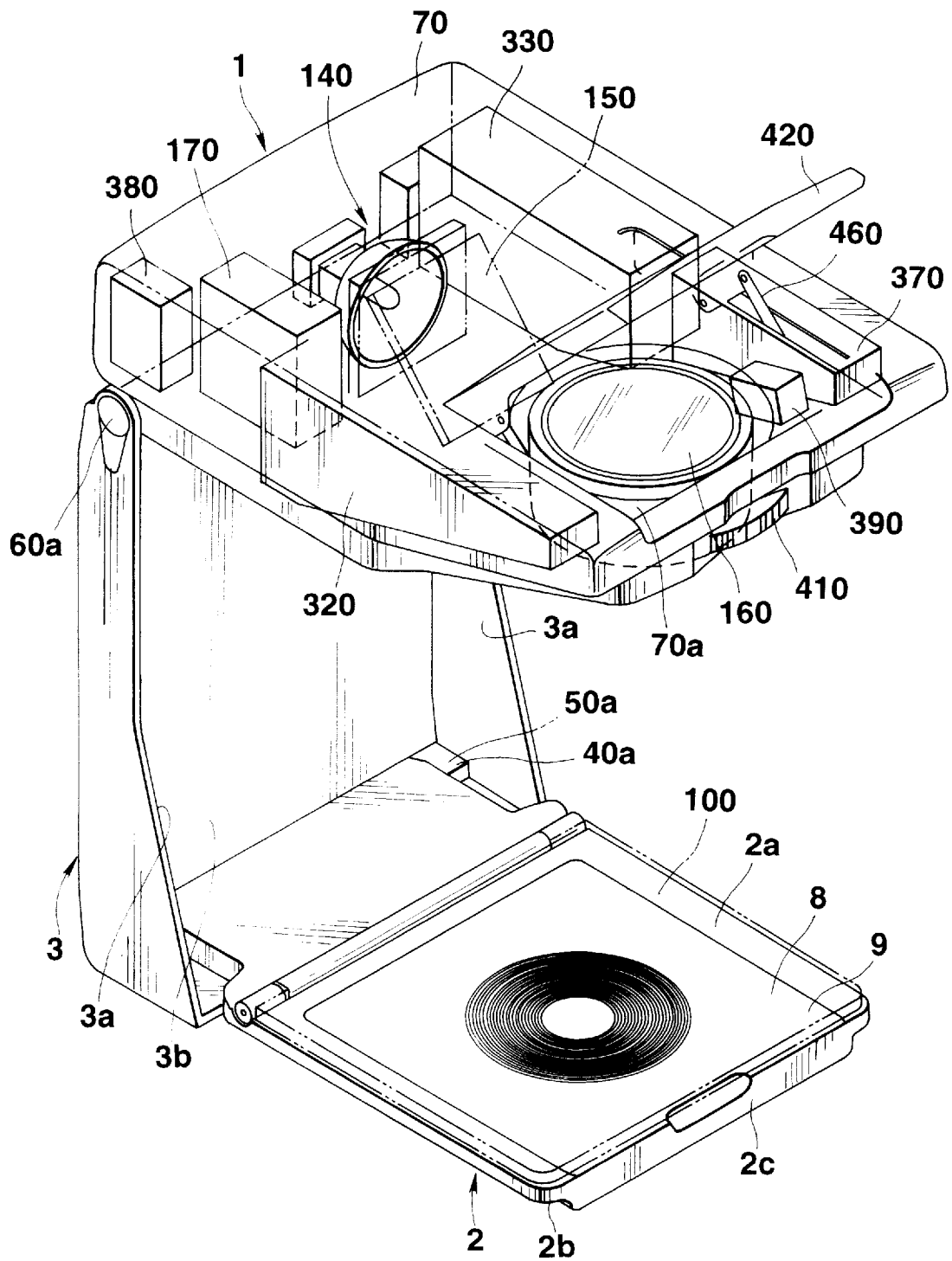
FIG. 16 is a perspective view of a portable overhead projector in a using state, according to a fourth embodiment of the present invention.
Figure 17:
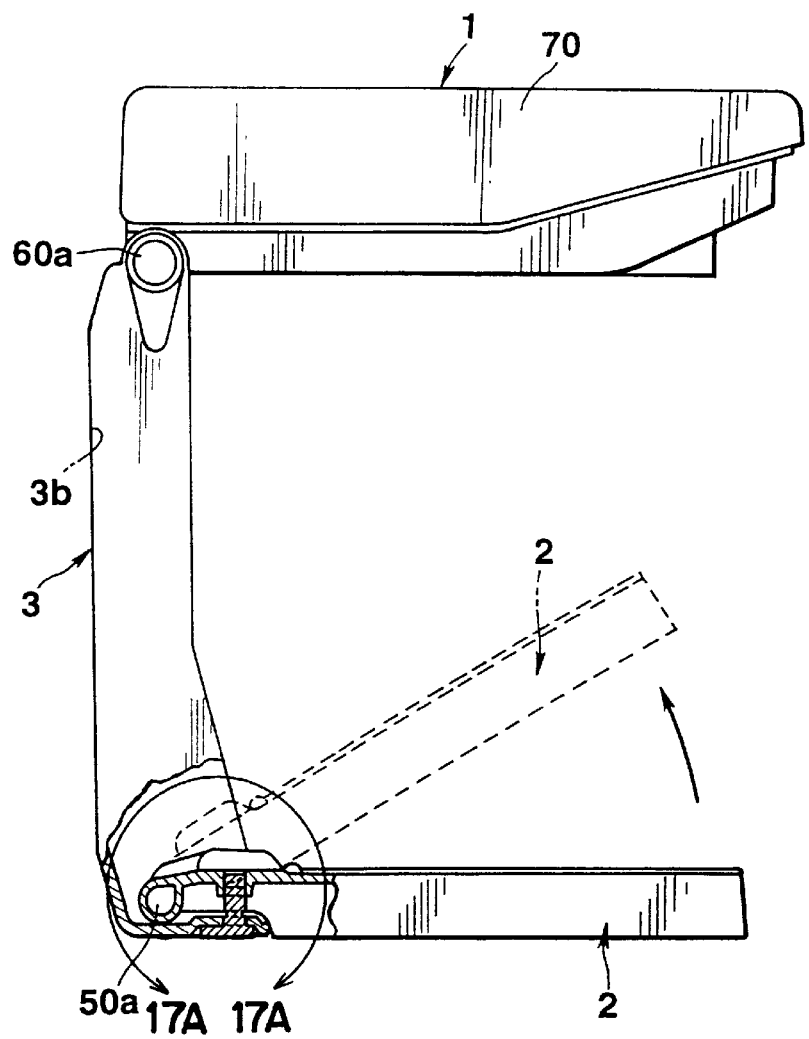
FIG. 17 shows a folding step of the portable overhead projector shown in FIG. 16.
Figure 17A:
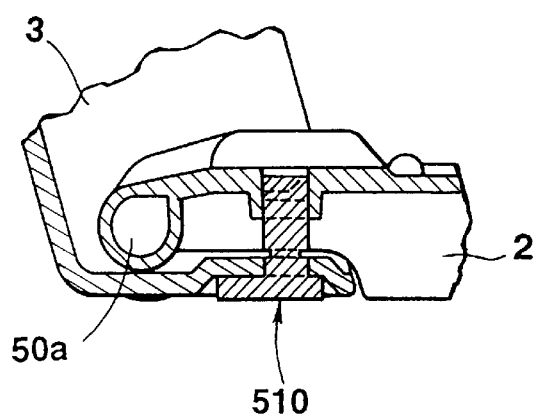
FIG. 17A is an enlarged view of the section 17A—17A of FIG. 17.
Figure 18:
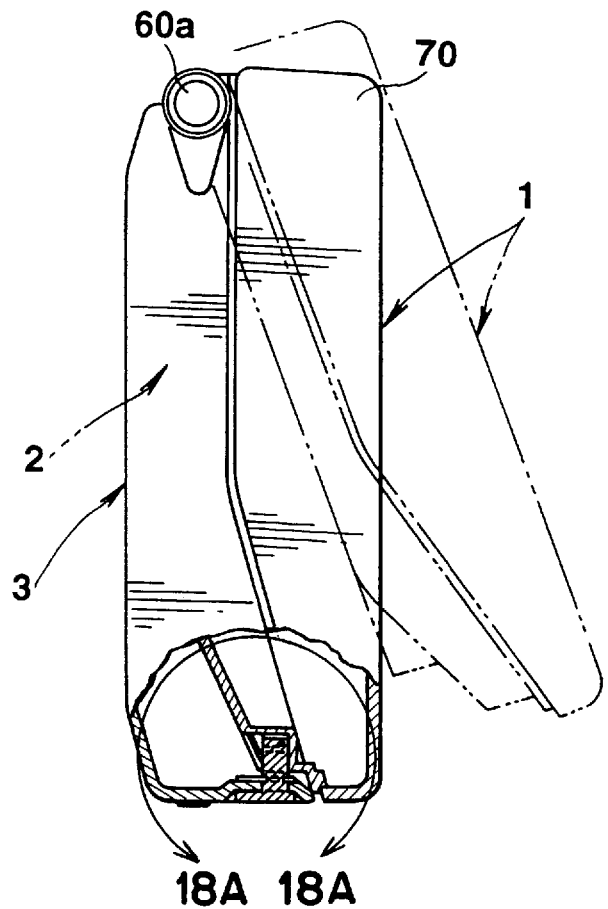
FIG. 18 shows a folding step following that of FIG. 17.
Figure 18:
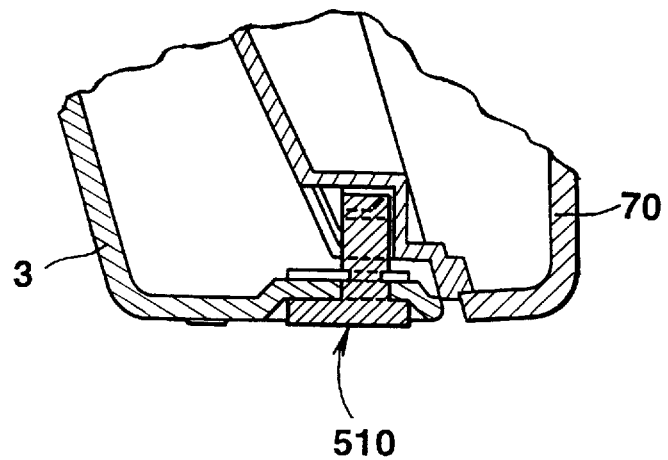

FIG. 16 is a perspective view of a portable overhead projector in a using state, according to the fourth embodiment of the present invention. FIG. 17 is a side view of the portable overhead projector in a state of folding the stage in the arm part. FIG. 18 shows a folding step following that of FIG. 17, and is a side view of the projector in a state of folding the projecting unit in the arm part in which the stage was already contained. This portable overhead projector comprises a projection unit 1, a stage 2 and an arm part 3, each of which has a similar size to one another in plan. The projection unit 1 and the stage 2 are connected to each other and can be folded, through the arm part 3. The volume of the projector when the projection unit 1 and the stage 2 are folded and contained into the arm part 3 as shown in FIG. 18, is approximately the same as that of a bible of about B6 in JIS.

That is, the arm part 3 which is made of a synthetic resin, a metal or the like, is formed in a shape of approximately box which has openings in the upper side and the right side, as shown in FIG. 16. The size of the arm part 3 is approximately the same as that of a bible of about B6, for example, having a width of about 130 mm, a length of about 180 mm and a thickness of about 50 mm. A bearing portion 40*a* is provided at the deep lower portion between the inner facing surfaces 3*a* and 3*a* of the arm part 3. A projecting supporting shaft 50*a* in the stage side is provided at both sides of an end portion (the left end portion in FIG. 16) of the stage 2 and is rotatably attached to the bearing portion 40*a*. A supporting shaft 60*a* in the projection unit side is spanned between the upper portions of the inner facing surfaces 3*a* and 3*a* of the arm part 3. An end portion (the left end portion in FIG. 16) of a unit case 70 of the projection unit 1 is attached to the supporting shaft 60a in the projection unit side. The supporting shaft 60a in the projection unit side has a rolling friction force giving mechanism (not shown) for giving a rolling friction force. Therefore, the projection unit 1 can be rotated on the supporting shaft when a rolling force larger than the predetermined rolling friction force due to the rolling friction force giving mechanism is given thereto with respect to the arm part 3.

The stage 2 which is made of a synthetic resin or the like, is formed in a shape of an approximately flat plate the size of which is approximately the same as that of the back inner surface 3b of the arm part 3, as shown in FIGS. 16 and 17. The stage 2 has a structure so that the stage 2 can be swung around the supporting shaft 50a in the stage side and can be contained in the inner deep side of the arm part 3 and so that the other end portion, i.e., the right end portion in these figures, can project in a horizontal direction. The stage 2 has a leg portion 2c on the lower surface 2b of the other end of the stage 2 which projects from the arm part 3, in order to keep the upper surface 2a of the stage 2 horizontally when the stage 2 projects from the arm part 3 in a horizontal direction. On the upper surface 2a of the stage 2, i.e., on a surface corresponding to the inner back surface 3b of the arm part 3, a Fresnel lens (a reflecting plate) 8 is provided, as shown in FIG. 16. On the Fresnel lens 8, an image projection sheet 9 having a size similar to that of a pocket notebook which will be hereinafter explained is placed, and a transparent sheet pressing plate 100 for holding down the image projection sheet 9 is swingably attached.

Figure 19:
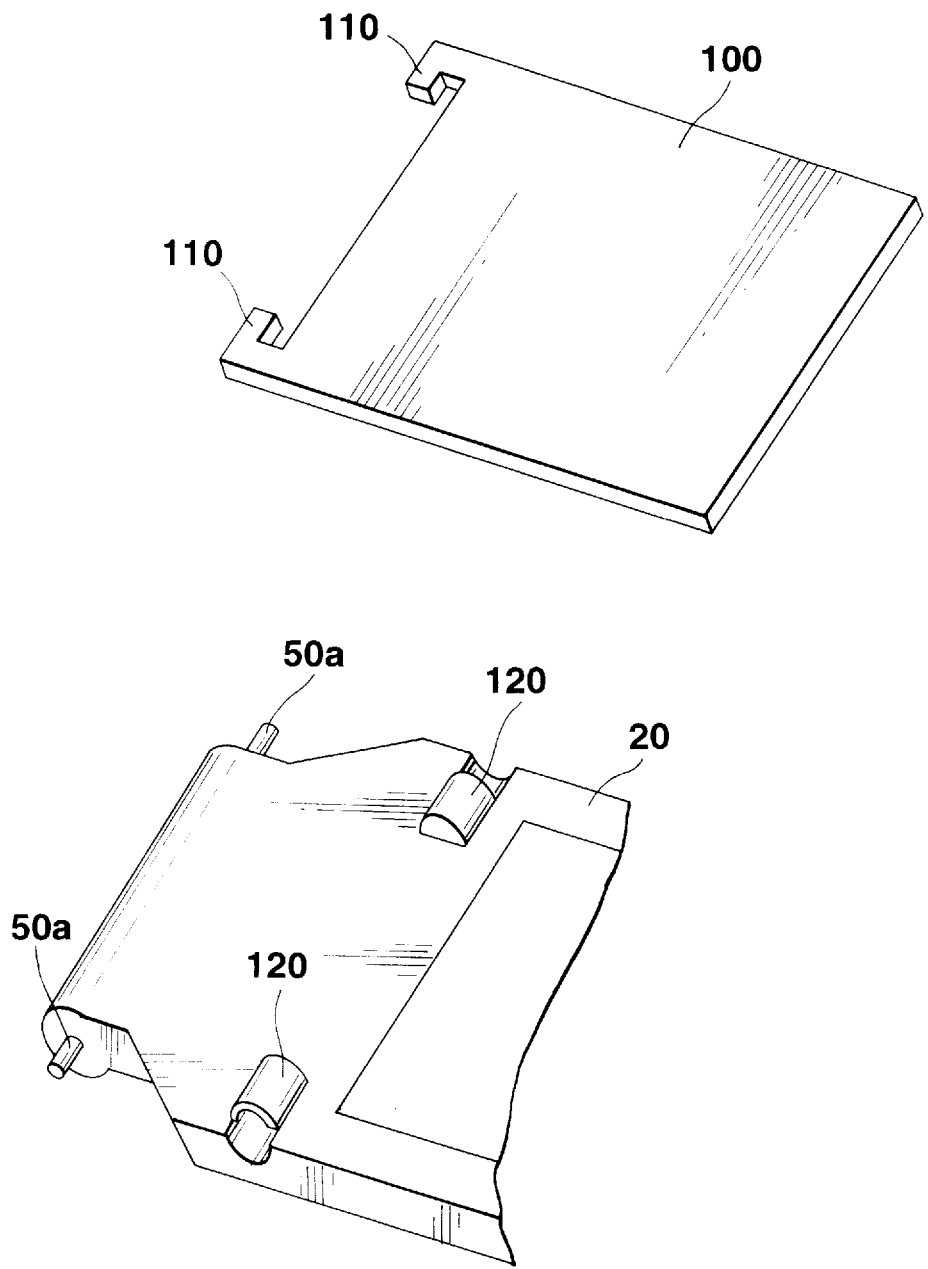
FIG. 19 is a perspective view showing an attachment structure of a sheet pressing plate shown in FIG. 16.
Figure 20A:
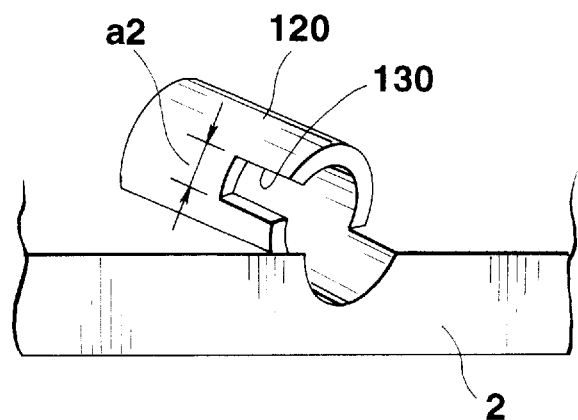
FIG. 20A is a perspective view showing a bearing portion shown in FIG. 19.
Figure 20B:
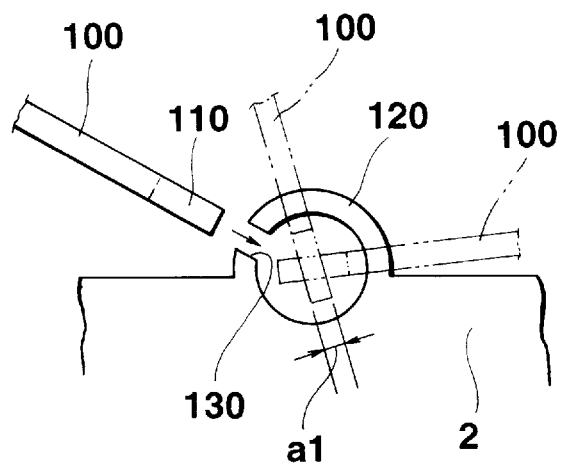
FIG. 20B is a side view showing a state of a shaft being inserted into the bearing portion.

Next, the attachment structure of the sheet pressing plate 100 will be explained with reference to FIGS. 19 and 20. At both sides of an end portion (the left end portion in FIG. 19) of the sheet pressing plate 100, projecting shaft portions 110 and 110 having a L-shape in plan and a rectangle in section are provided. At the side connected to the arm part 3, i.e., at the side of an end portion (the left end portion side in this figure) of the stage 2, bearing portions 120 and 120 in which the shaft portions 110 and 110 are rotatably set are provided. In each bearing portion 120, as shown in FIG. 20A, an insertion groove 130 having a width a2 which corresponds to the short side a1 of the section of the shaft portion 110 is provided toward the side to be connected to the arm part 3. The sheet pressing plate 100 is rotatably attached to the stage 2 by the shaft portions 110 inserted into the insertion grooves 130 of the bearing portions 120 in the direction of an arrow, as shown in FIG. 20B. In this case, because the section of each shaft portion 110 of the sheet pressing plate 100 has a rectangular shape, even if someone intends to take out the shaft portions 110 through the insertion grooves 130 in a state of the stage 2 connected to the arm part 3, the sheet pressing plate 100 comes in contact with the arm part 3, so that the shaft portions 110 do not get out of the bearing portions 120. The unit ase 70 of the projection unit 1 is made of a synthetic resin or the like and has a shape similar to and slightly smaller than the inner shape of the arm part 3, and thereby can be contained in the arm part 3 together with the stage 2, as shown in FIGS. 16 and 18. FIG. 21 is a plan view showing the interior of the unit case 70. In the interior of the unit case 70, a light source part 140 which will be described later, a total reflection mirror 150, a projection lens 160, a cooling fan 170, and an electric circuit part are provided, as shown in FIGS. 16 and 21.

Figure 22:
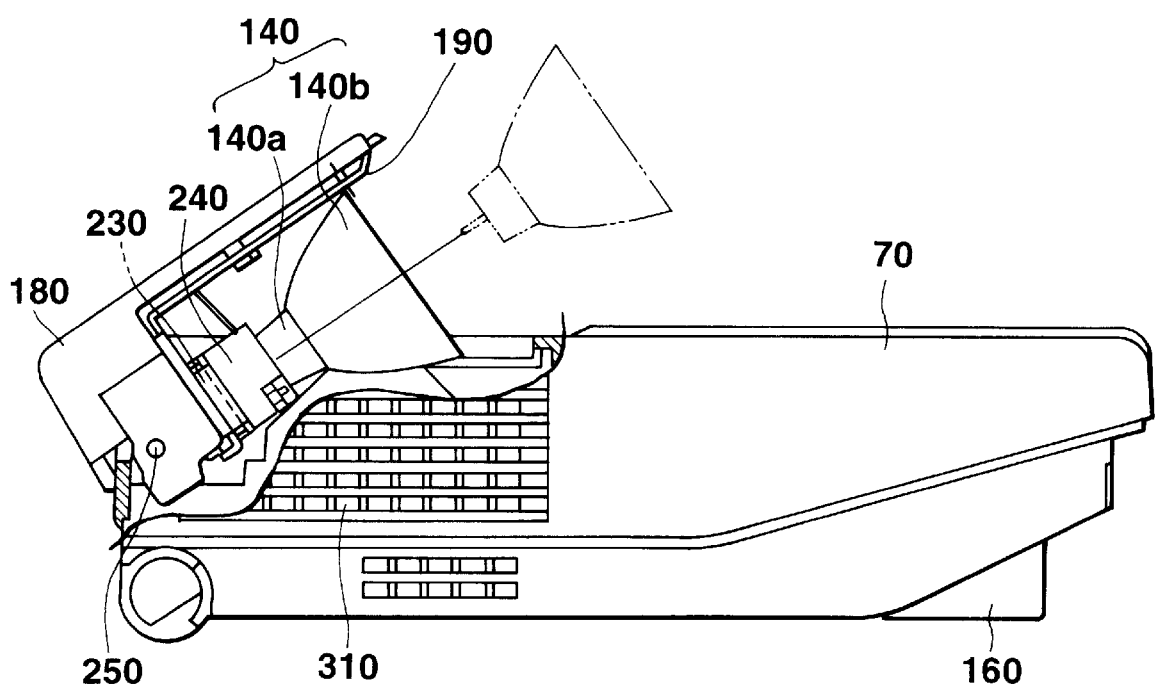
FIG. 22 is a side view showing an attachment structure of the light source part shown in FIG. 16.

The unit case 70 is provided with a closing cover 180 for the light source having air vents 180a along the upper surface to a side surface, as shown in FIG. 22. The light source part 140 is attached to an inner surface of the closing cover 180 for the light source which corresponds to a side surface of the unit case 70, through an upper heat insulating plate 190 which will be described later. The light source part 140 comprises a light source 140a having a halogen lamp or the like and a reflector 140b for reflecting light from the light source 140a. In the periphery of the light source 140a, four heat insulating plates 190, 200, 210, and 220 for cutting off the radiant heat from the light source part are arranged, as shown in FIG. 23.

Figure 23:
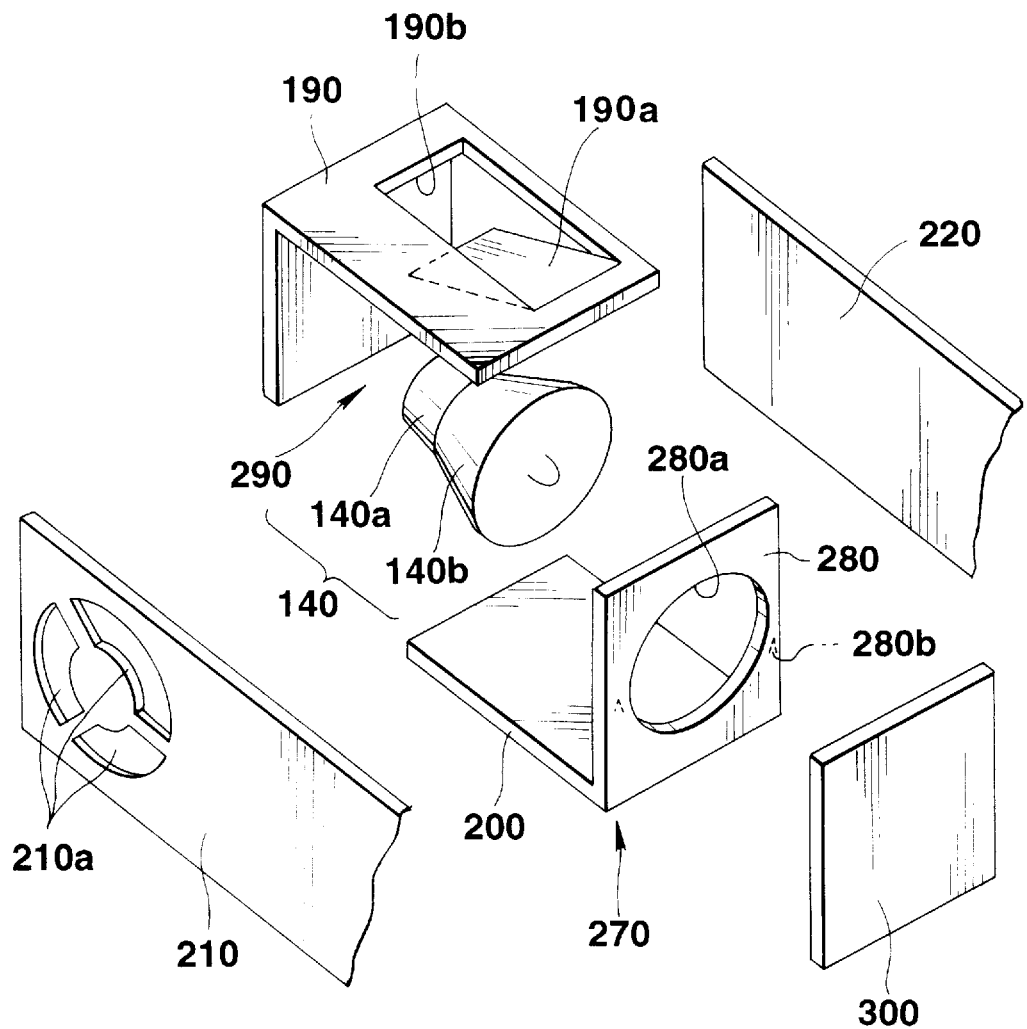
FIG. 23 is a perspective view of a heat insulating plate which is provided around the light source part.
Figure 24A:
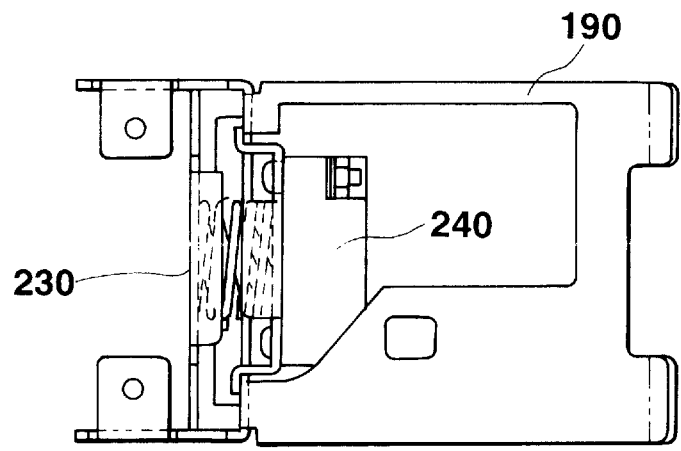
FIG. 24A is a perspective view showing an attachment structure of a socket into which the light source part shown in FIG. 23 is attached.
Figure 24B:
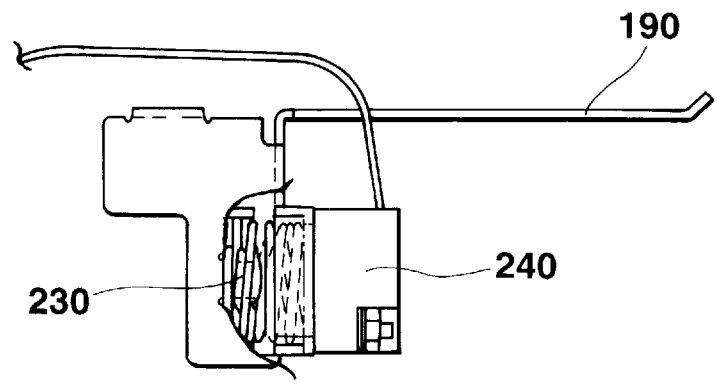
FIG. 24B is a side view thereof.
Figure 25A:
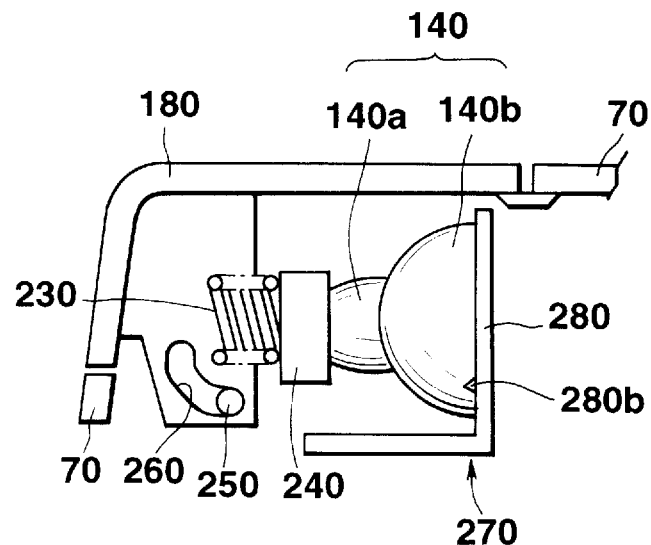
FIG. 25A is a side view showing a state of a closed cover for the light source being closed.
Figure 25B:
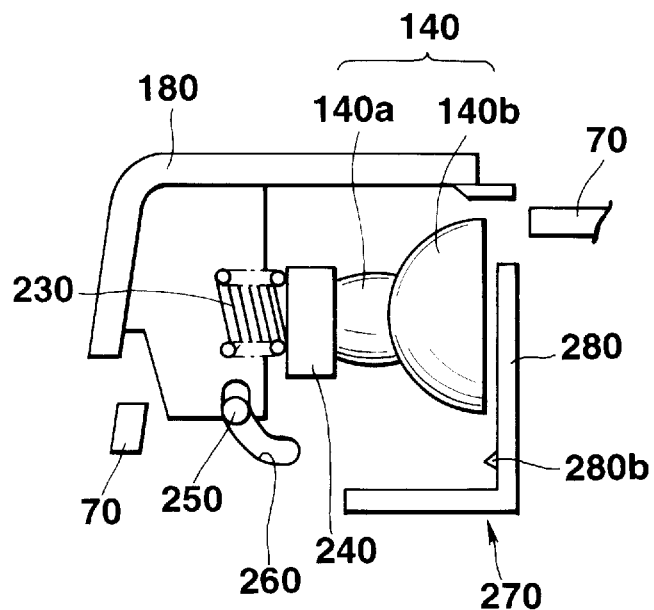
FIG. 25B is a side view showing a state of the cover for the light source being opened.

On the upper heat insulating plate 190, a socket 240 is provided through an elastic member 230 such as a coil spring or the like, as shown in FIGS. 22 and 24. The light source part 140 can be attached to the socket 240 so as to permit installation and removal thereof. The light source part 140 can be moved in a desired direction by the elastic member 230. The closing cover 180 for the light source is provided to be swingable around a supporting shaft 250 which is movably attached to the unit case 70, as shown in FIGS. 25A and 25B. That is, the supporting shaft 250 which projects from and is attached to both side surfaces of the closing cover 180 for the light source, can be moved in long curved holes 260 which are formed in the unit case 70, and is rotatably inserted in the curved holes. At a position in the front of the light source part 140 (in the right side in these figures), a position regulating plate 270 is arranged. The position regulating plate 270 is formed to have an L-shaped section, as shown in FIG. 23. The vertical portion of the position regulating plate 270 acts as a position regulating portion 280 and the lower horizontal portion thereof acts as a lower heat insulating plate 200. An opening 280a having a diameter corresponding to that of the circle of the top of the reflector 140b is formed in the position regulating portion 280, and a projection 280b for positioning is attached to the position regulating portion 280. When the closing cover 180 for the light source is pressed into a horizontal direction, as shown in FIG. 25A, the supporting shaft 250 is moved and positioned to the lower ends of the long curved holes 260 to close the cover 180 for the light source. In this state, the front periphery portion of the reflector 140b is pressed against the position regulating portion 280 by the elastic force of the elastic member 230, and the peripheral surface of the reflector 140b comes to in contact with the projection 280b for positioning and is thereby positioned. On the other hand, when the closing cover 180 for the light source is drawn in a horizontal direction and is lifted up, as shown in FIG. 25B, the supporting shaft 250 is moved and positioned to the upper ends of the long curved holes 260 to open the cover 180 for the light source. When the closing cover 180 for the light source is swung from the state, it is possible to take the light source part 140 out, as shown in FIG. 22.

Figure 26:
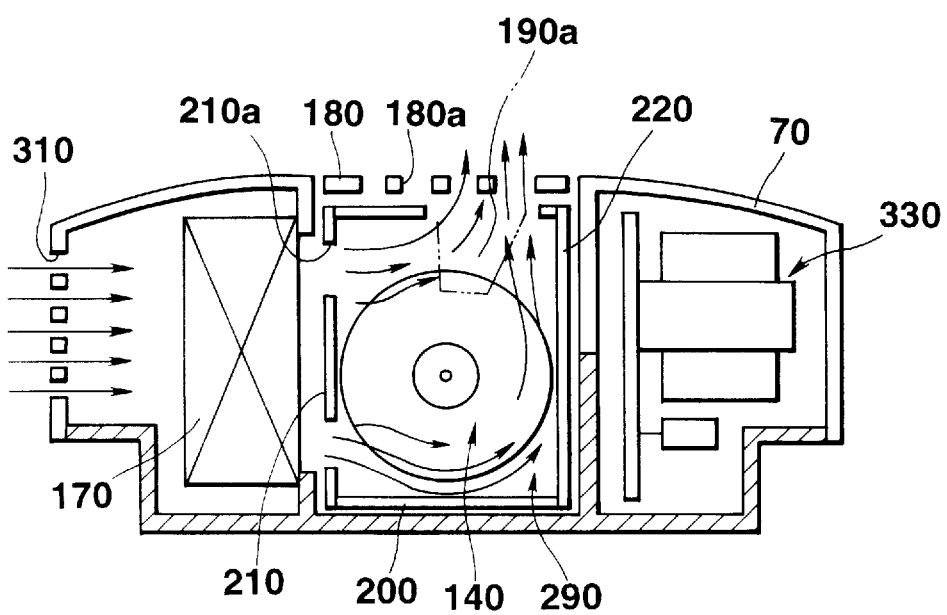
FIG. 26 is a sectional view showing a state of the light source part being cooled.

As shown in FIG. 23, in the four heat insulating plates 190, 200, 210, and 220, the upper heat insulating plate 190 is formed to have an L-shape, the lower heat insulating plate 200 corresponds to the lower horizontal portion of the L-shaped position regulating plate 270, and the left side and the right side heat insulating plates 210 and 220 are formed in a flat plate shape. The whole of the heat insulating plates 190, 200, 210, and 220 form a square cylinder-shaped light source containing part 290. In the upper heat insulating plates 190, a rising cut portion 190a which is inclined along the outer peripheral surface of the light source part 140 is provided, and an opening 190b corresponding to the rising cut portion 190a is also provided. In the left heat insulating plates 210, three fan-shaped openings 210a are formed at positions corresponding to the light source part 140. At a position in the front of the opening 280a of the position regulating portion 280 (in the right side in FIG. 23) outside the light source containing part 290, a filter 300 for absorbing infrared rays is disposed. Outside the light source containing part 290, as shown in FIG. 26, a cooling fan 170 is disposed to face the openings 210a of the left heat insulating plates 210. The cooling fan 170 cools the light source part 140, by introducing outer cool air into the light source containing part 290 through air vents 310 for the fan which are formed in the left side of the unit case 70, and by discharging warm air in the light source containing part 290 through the air vents 180a.

The electric circuit part comprises three circuit parts of a filter circuit 320, a voltage transforming circuit 330, and a fan control circuit 340, which are dividedly installed in the unit case 70, as shown in FIG. 21. The filter circuit 320 is for removing noise components of supplied AC power to supply it to the voltage transforming circuit 330 and is installed on a circuit board 350 which is disposed in the right-half of this side of the unit case 70. The voltage transforming circuit 330 is for lowering the voltage of AC power supplied from the filter circuit 320 to supply it to the light source part 140 and the fan control circuit 340, and is installed on a circuit board 360 which is disposed in the left-half of the innermost side of the unit case 70. The fan control circuit 340 is for converting the AC power supplied from the voltage transforming circuit 330 to a DC power to supply it to the cooling fan 170, and is installed on a circuit board 370 which is disposed in the right-half of the innermost side of the unit case 70. The circuit boards 350, 360, and 370 are attached to the unit case 70 to freely permit installation and removal thereof. In the left end portion of this side of the unit case 70, a socket 380 which is an inlet for taking the AC power in. In this structure, because the electric circuit part for driving the light source part 140 and the cooling fan 170 is installed in the projection unit 1, it is unnecessary to perform wiring of circuit cables or the like around portions other than the projection unit 1, e.g., the arm part, the stage or the like. Consequently, it is possible to enhance the installation density.

Figure 27:
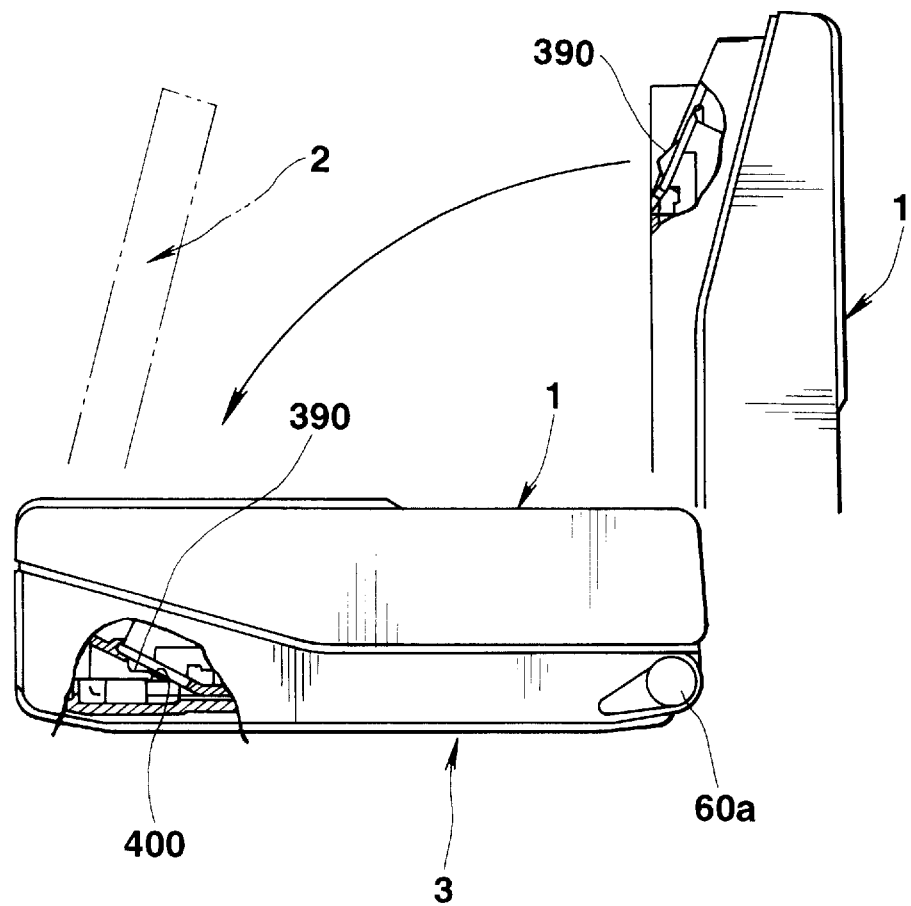
FIG. 27 is a side view partly in section, showing a power switch which is turned off when the projection unit shown in FIG. 16 is contained in the arm part.
Figure 28A:
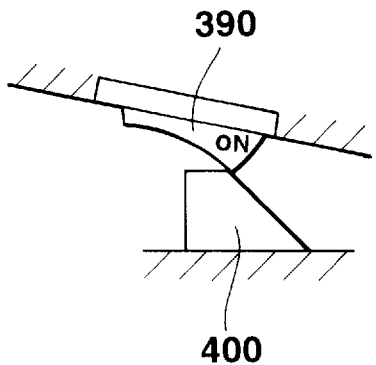
FIG. 28A and FIG. 28B are views showing steps of turning off the power switch shown in FIG. 27.
Figure 28B:
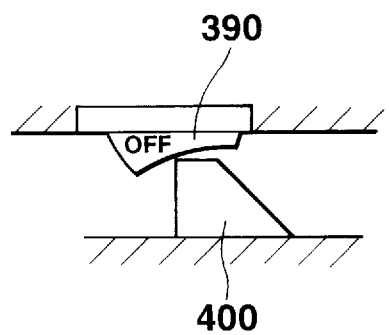

As shown in FIGS. 16 and 21, in the other end portion (in the right end portion in these figures) on the lower surface of the unit case 70, a power switch 390 is provided. The power switch 390 can be pressed by a boss 400 which is stood on an end portion (in the left end portion in FIG. 17) of a lower surface of the stage 20 when the projection unit 1 is folded after the stage 20 was contained in the arm part 3, as shown in FIG. 27. In this case, even if the power switch 390 is in an ON state, as shown in FIG. 28A, when the power switch 390 is pressed by the boss 400, the power switch 390 is turned off, as shown in FIG. 28B.

As shown in FIG. 16, in the other end side (in the right end side in FIG. 16) on the upper surface of the unit case 70, a recess portion 70a is formed up to the top end surface thereof. The projection lens 160 is disposed in the recess portion 70a on the unit case 70 so that the projection lens 160 is movable along the light axis thereof in an exposed state. In the recess portion 70a on the unit case 70, a focus adjusting knob 410 which is for adjusting the focus position of the projection lens 160 by moving the projection lens 160 along the light axis thereof, is provided in a state of a portion thereof projecting from the recess portion 70a toward the top end of the unit case.

Figure 29:
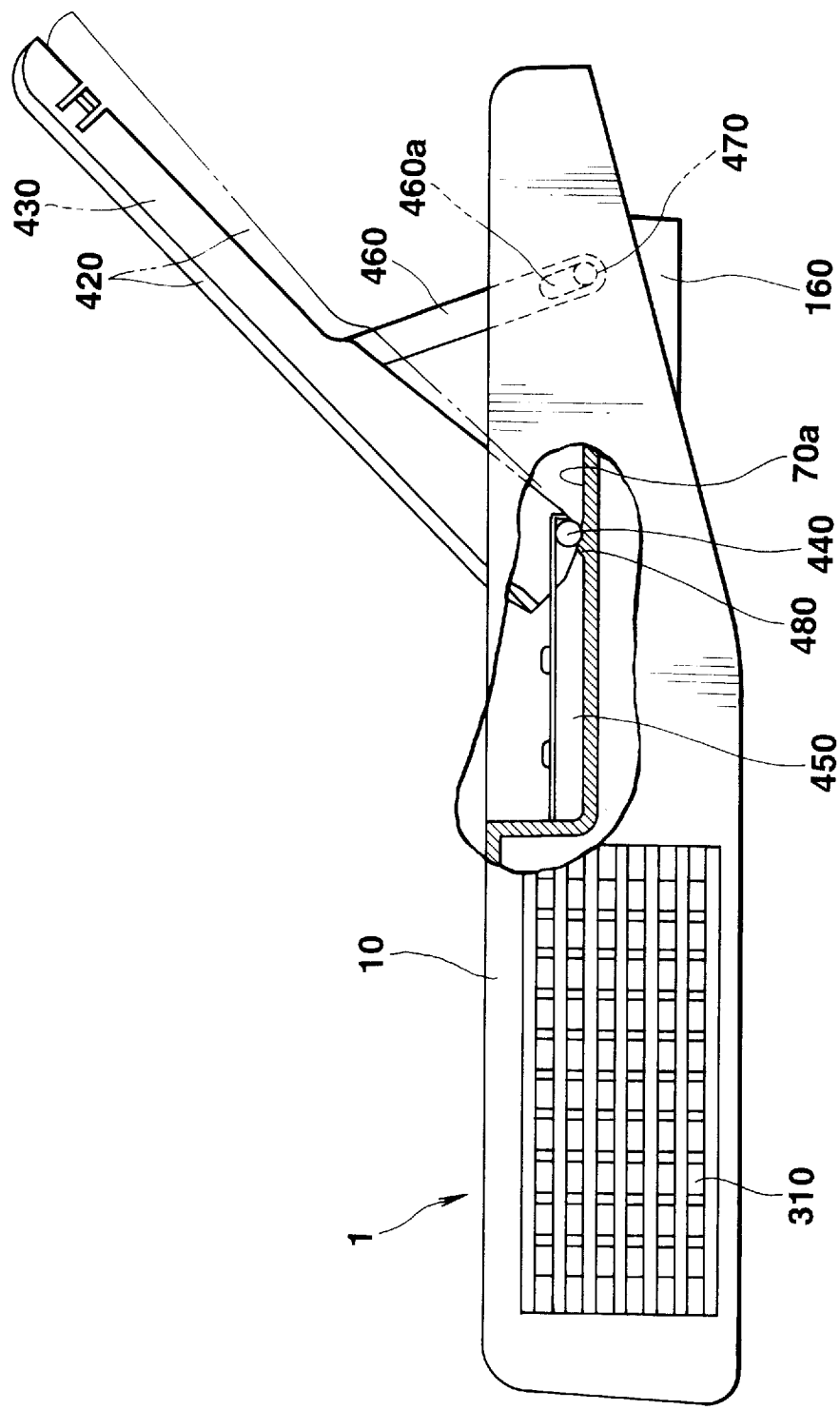
FIG. 29 is a side view showing an attachment structure of a cover to which the projection mirror shown in FIG. 16 is attached.
Figure 30:
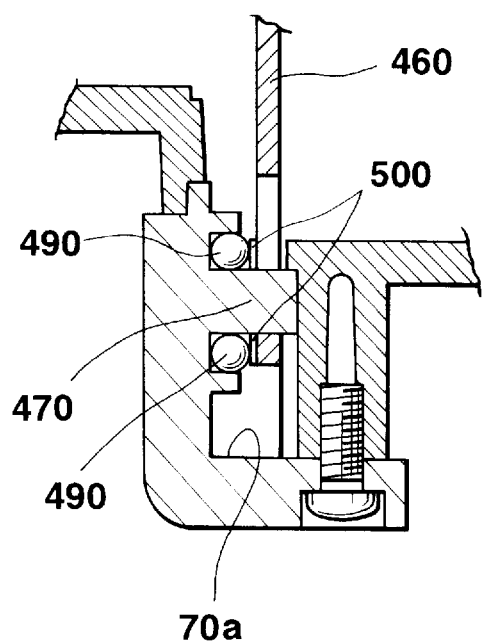
FIG. 30 is a sectional view showing an attachment structure of the cover.

In the recess portion 70a of the unit case 70, as shown in FIG. 29, a projection mirror 430 is provided on the lower surface of a cover 420 facing the projection lens 160. The cover 420 is attached to the unit case 70 so that the cover 420 can be stood or laid by a standing and laying mechanism thereof and the standing angle thereof can be adjusted by an angle adjusting mechanism. In the standing and laying mechanism, a movable shaft 440 is provided on both sides of an end (the lower left end in FIG. 29) of the cover 420 to project laterally. The movable shaft 440 is movably inserted in a guiding groove 450 which is provided in an innermost side on the facing surface in the recess portion 70a. To an intermediate position of each side surface of the cover 420, an end (the upper end in FIG. 29) of a supporting lever 460 is swingably attached. In the vicinity of the other end (the lower end in FIG. 29) of each supporting lever 460, a long hole 460a is formed. A projecting fixed shaft 470 which is provided in this side (the right side in FIG. 29) with espect to the guiding groove 450, of each facingsurface in the recess portion 70a, is swingably inserted in the long hole 460a. At an end portion (the right end portion in FIG. 29) of the guiding groove 450, a stopping portion 480 is formed. The angle adjusting mechanism has a structure in which an elastic member 490, e.g., a rubber packing or the like, is inserted between each supporting lever 460 and each facing surface in the recess portion 70a, as shown in FIG. 30. The reference numeral 500 denotes a washer made of nylon for making each supporting lever 460 easy to slip. The cover 420 can be stood up or laid down in the recess portion 70a, by swinging the supporting lever 460 around the other end thereof and moving the movable shaft 440 in the guiding groove 450, as shown in FIG. 29. Therefore, in a state of the cover 420 being laid down and contained in the recess portion 70a, the cover 420 covers to protect the projection lens 160. In a state of the cover 420 being stood up, the movable shaft 440 is stopped at the stopping portion 480 in the guiding groove 450 and is supported to incline with a predetermined angle by the supporting lever 460. The cover 420 can be lifted upward and downward by sliding the supporting lever 460 upward and downward, so that the standing angle of the projection mirror 150 can be finely adjusted.

Figure 31:
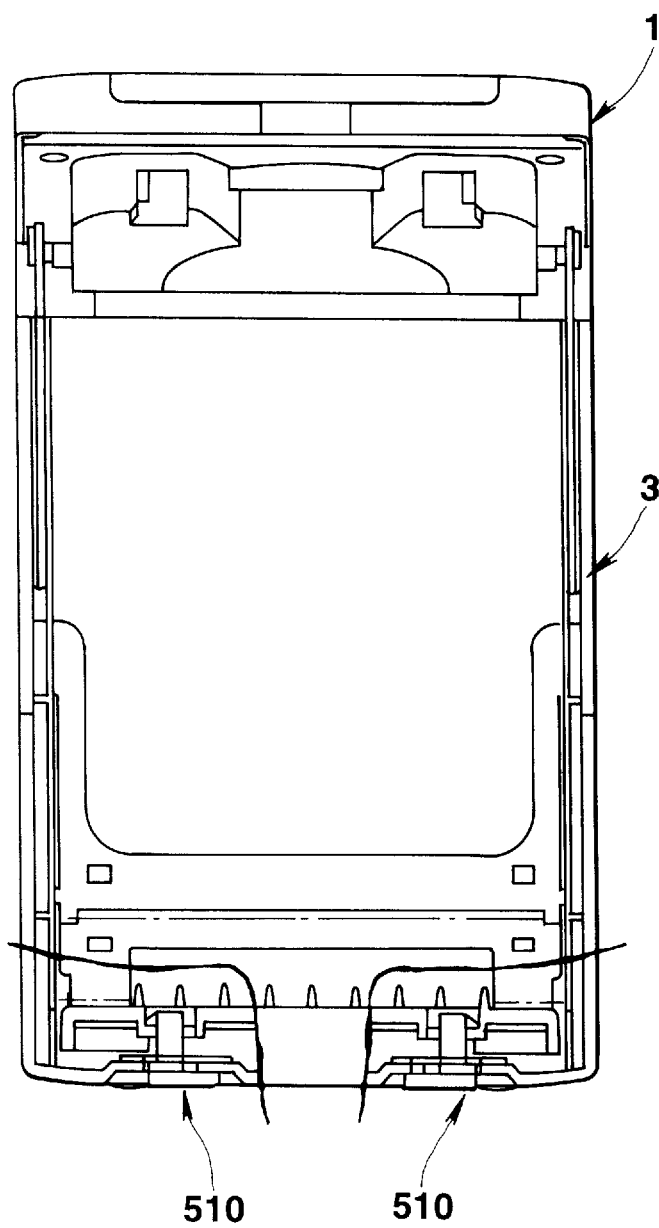
FIG. 31 is a view of a locking mechanism in the portable overhead projector in a using state.
Figure 32A:
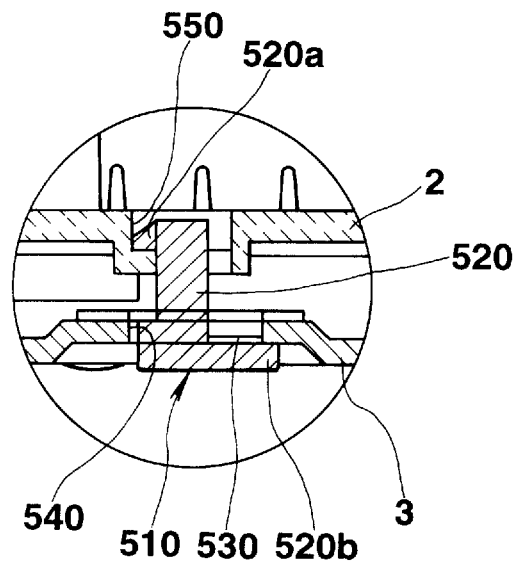
FIG. 32A is a sectional view showing the locking mechanism shown in FIG. 31 in a locking state.
Figure 33:
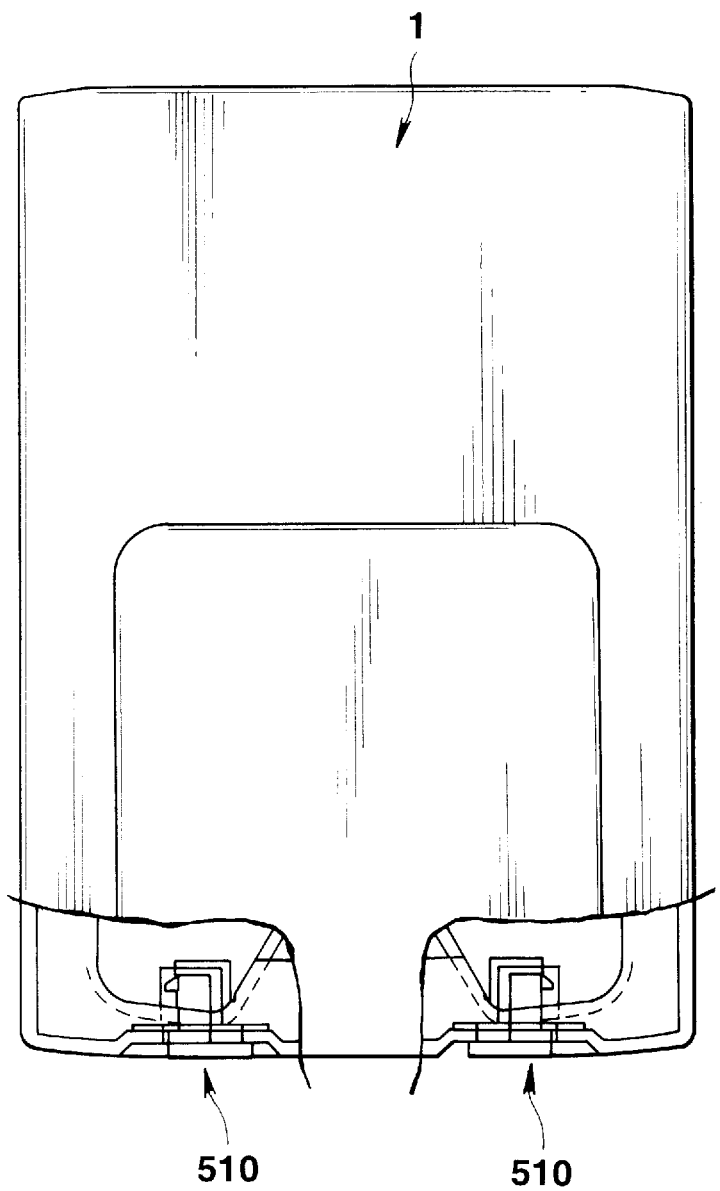
FIG. 33 is a plan view of the locking mechanism in the portable overhead projector which is in a folded state.
Figure 34A:
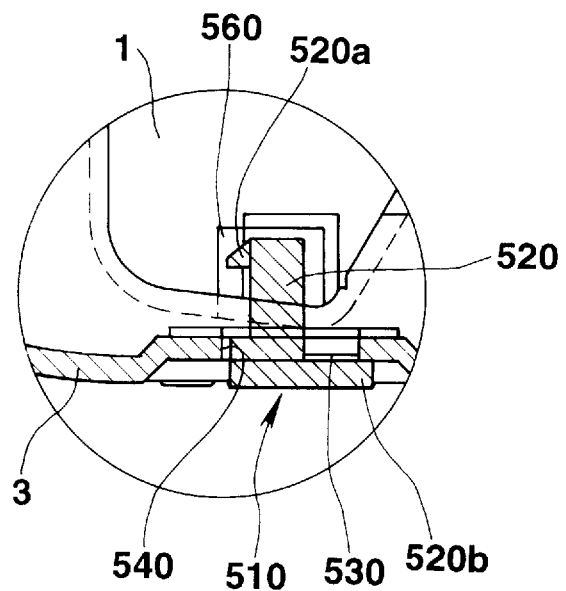
FIG. 34A is a sectional view showing the locking mechanism shown in FIG. 33 in a locking state.

As shown in FIGS. 31 and 33, a locking mechanism 510 for locking the projection unit 1 to the arm part 3 while contained and for locking the stage 20 to the arm part 3 while used, is provided at a lower end portion of the arm part 3. The locking mechanism 510 comprises a pair of approximately L-shaped lock pins 520 each of which has a stopping portion 520a at an end thereof and has an operating portion 520b at the other end thereof, and an elastic member 530 such as a coil spring or the like, as shown in FIGS. 32A and 34A. Each lock pin 520 is slidably arranged in a state of an end projecting upward from the lower inner surface of the arm part 3 through a long hole 540 which is formed in a lower end portion of the arm part 3. The elastic member 530 which is disposed between the arm part 3 and the lock pin 520, gives a force in a direction in which ocking is performed.

Figure 32B:
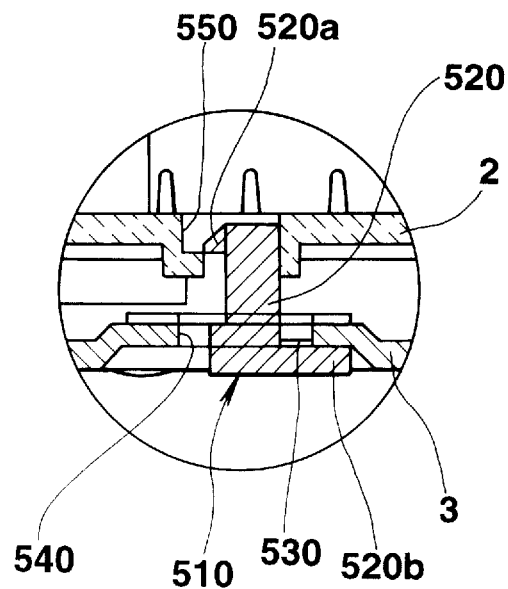
FIG. 32B is a sectional view showing the locking mechanism in an unlocking state.
Figure 34B:
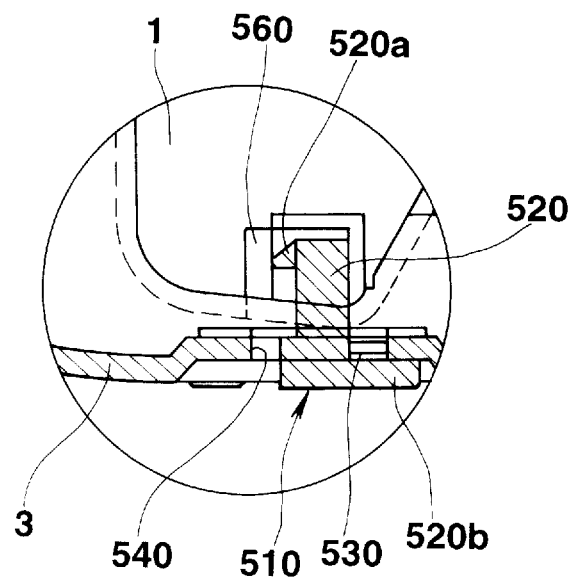
FIG. 34B is a sectional view showing the locking mechanism in an unlocking state.
Figure 35:
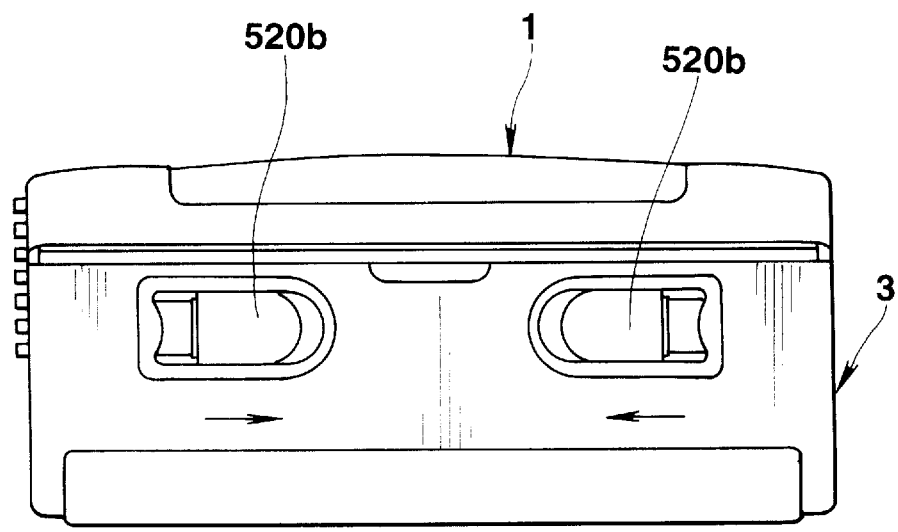
FIG. 35 is a front view of the locking mechanism shown in FIG. 33.

In this locking mechanism 510, when using the projector, i.e., when the stage 2 is projecting in a horizontal direction from the arm part 3, the stopping portion 520a of each lock pin 520 slid by the elastic force of the elastic member 530 enters a stopping recess portion 550 which is provided in the lower surface 2b of the stage 2 to lock the stage 2, as shown in FIG. 32A. When the operating portion 520b of the lock pin 520 projecting out of the arm part 3 is slid against the elastic force of the elastic member 530, the stopping portion 520a is moved apart from the stopping recess portion 550 of the stage 2 to unlock the stage 2, as shown in FIG. 32B. On the other hand, when the stage 2 and the projection unit 1 are contained into the arm part 3, the stopping portion 520a of the lock pin 520 slid by the elastic force of the elastic member 530 enters a stopping recess portion 560 which is provided in the lower surface of the projection unit 1 to lock the projection unit 1, as shown in FIG. 34A. When the operating portion 520b of the lock pin 520 projecting out of the lower end portion the arm part 3 is slid against the elastic force of the elastic member 530, the stopping portion 520a is moved apart from the stopping recess portion 560 of the projection unit 1 to unlock the projection unit 1, as shown in FIG. 34B.

Figure 4:
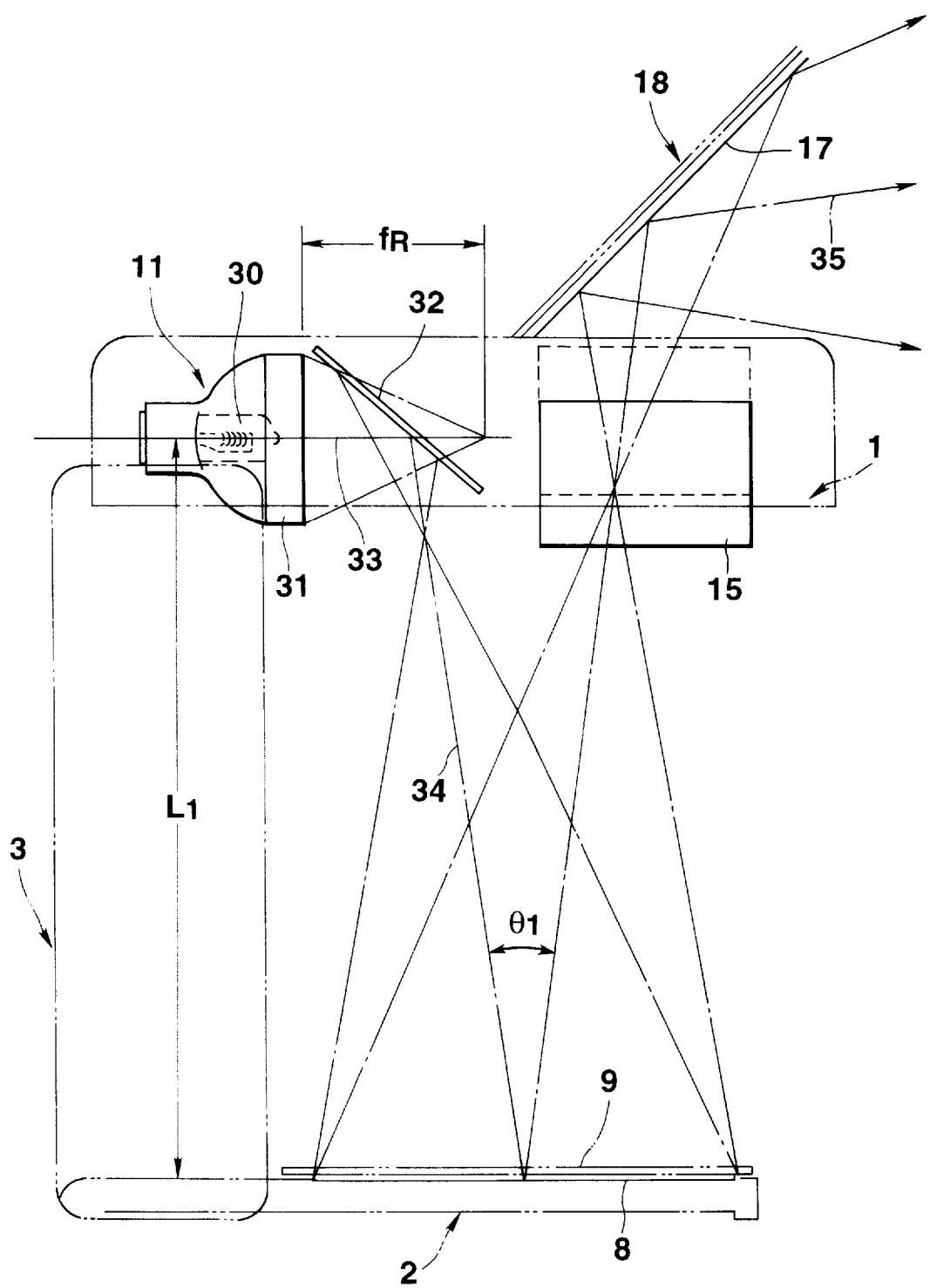
FIG. 4 is a view showing light paths and optical elements on the light paths, shown in FIG. 1.

Because each of the light paths and the optical elements on the light paths, in the portable overhead projector according to the present invention is approximately the same as that of the embodiment shown in FIG. 4, the explanation for these are omitted.

Figure 36:
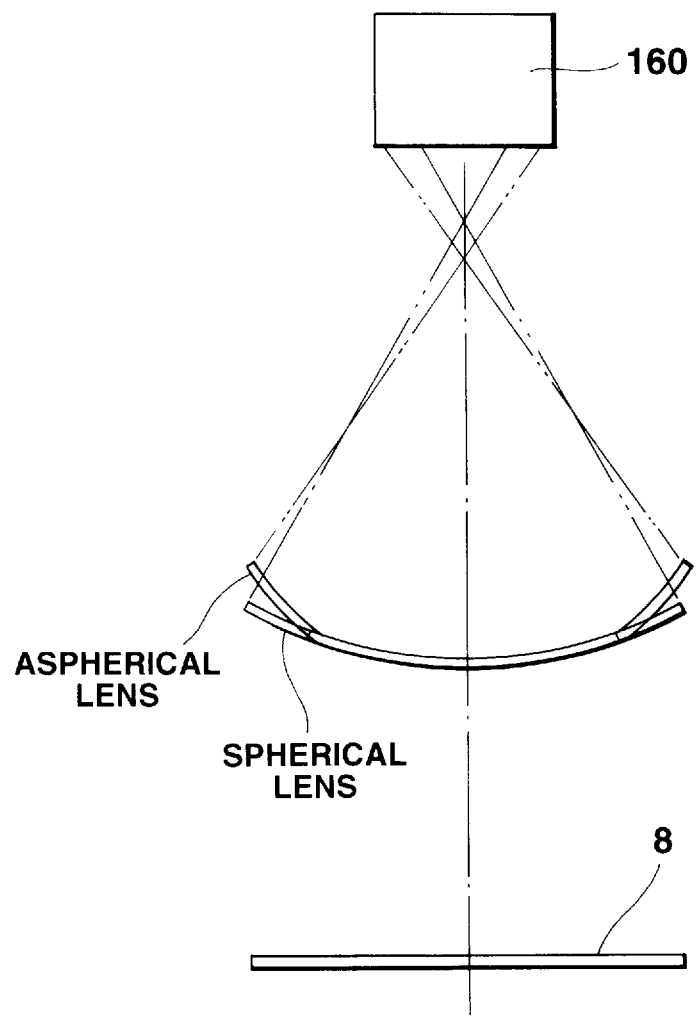
FIG. 36 is a view showing the Fresnel lens shown in FIG. 16 being aspherical.

The reflecting surface of the Fresnel lens 8 shown in FIG. 16 is formed to be aspherical so that as a portion is the nearer the center thereof the larger the radius of curvature of the portion is. This is aspherical so that the curvature of each portion continuously changes from the center thereof to the periphery, as shown in FIG. 36, i.e., a view for explaining the principle, for example, the focal length of the center portion is 100 mm and that of the periphery portion is 93 mm. The aspheric surface can be expressed by the following general equation.

$$Z = (1/R)\tilde{N}L2/[1-\{1-(A2+1)\tilde{N}(1/R2)\tilde{N}L2\}] + A4L4 + A6L6,$$

wherein Z is the amount of sag at a distance L from the center of the lens, R is a paraxial curvature radius, and A is an aspherical factor.

Figure 37:
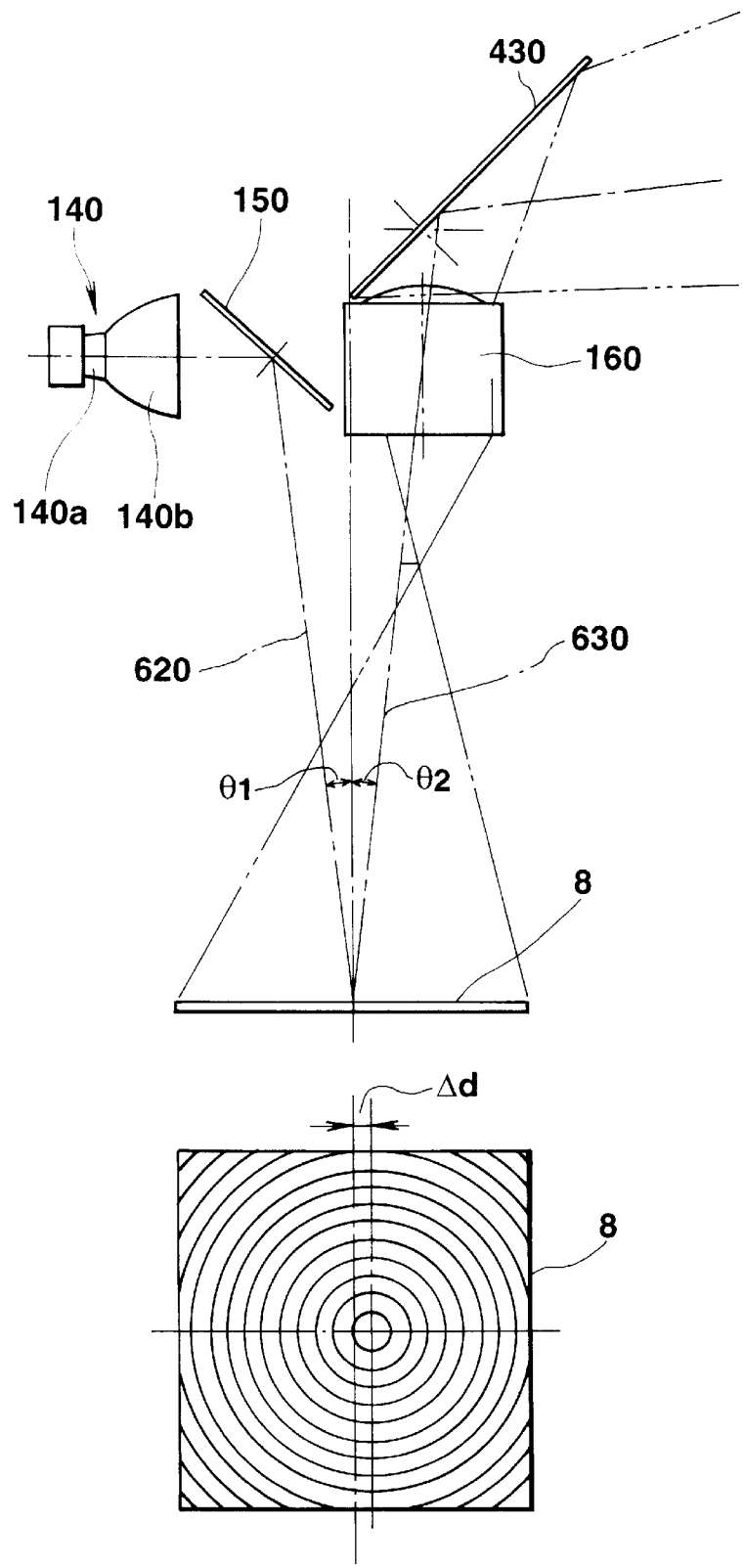
FIG. 37 is a view showing the center of the Fresnel lens shown in FIG. 16 being shifted toward the side of the projection lens.

The center of the Fresnel lens 8 is deviated from the side of the light source part 140 toward the side of the projection lens 160, as shown in FIG. 37, so that it is possible to let enough light from the light source part 140 into the projection lens 160. The amount of the deviation d is in the range of 5–10 m. Thereby, the angle 1 of the incident light 620 with respect to the normal comes to be different from the angle 2 of the outgoing light 630 in the upper surface side of the Fresnel lens 8 with respect to the normal.

Figure 38:
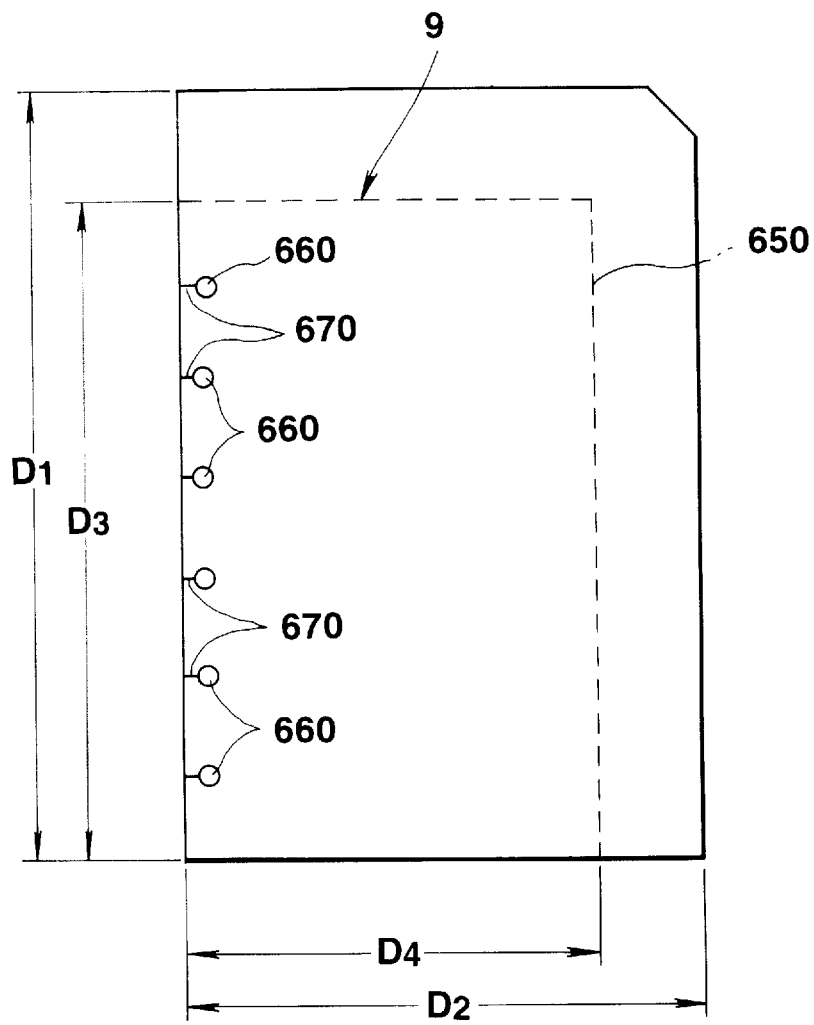
FIG. 38 is a plan view of an image projection sheet.

The transparent image projection sheet 9 which is placed on the Fresnel lens 8 on the stage is formed in a predetermined size (D1×D2 mm) in which a desired image information can be printed by using a printer or a copying machine, as shown in FIG. 38. The image projection sheet 9 has a perforation 650, in order to cut it in a designated size (D3×D4 mm) after printing. In the vicinity of one of the long sides of the image projection sheet 9, a plurality of through holes 660 for a binder are formed at approximately equal spaces. A perforation 670 is formed from the through holes 660 up to the end of the long side. The perforation 670 is for permitting installation and removal of the image projection sheet 9 without opening the binder. For example, when the predetermined size is about a post card size (D1=148 mm, D2=100 mm), the designated size is about a pocket notebook size (D3=127 mm, D4=80 mm). When the predetermined size is about the COM-10 size (D1=241 mm, D3=105 mm), the designated size is about a pocket notebook size (D3=184 mm, D4=80 mm).

As described above, according to such a portable overhead projector, because the image projection sheet is formed in a size in which a desired image information can be printed by using a printer or a copying machine, and has a perforation 650 in order to cut it in a designated size similar to about a pocket notebook size after printing, it is possible to make an image projection sheet 9 having a size not larger than that of a pocket notebook easily and conveniently, by printing information, e.g., a document, an image or the like, which was prepared by a known personal computer or a word processor, by using a printer, or by reduction-copying the information by using a copying machine.

Therefore, by using an image projection sheet 9 having about a pocket notebook size, it is possible to form the stage 2 in a size of a pocket notebook, for example, in a size of a bible corresponding to about B6 size in JIS. Therefore, it is possible to form each of the projection unit 1 and the arm part 3 in approximately the same size as the stage 2. Accordingly, the portable overhead projector enables extremely miniaturizing the whole device and making it lightweight.

In the portable overhead projector, the light source part 140, the projection lens 160, the cooling fan 170, and an electric circuit part are provided in the projection unit 1, and the electric circuit part comprises the filter circuit 320, a voltage transforming circuit 330, and a fan control circuit 340 for controlling to drive the cooling fan, which are dividedly installed in the projection unit 1 according to the function of the respective circuits. Accordingly, it is possible to install these circuits in spaces in the projection unit 1 dividedly and thereby to enhance the installation density, furthermore to extremely miniaturize the whole device and to make it lightweight, and to obtain a portable overhead projector having an excellent portability. Further, because these circuits are dividedly installed according to the function of the respective circuits, it is required only to change a necessary circuit, without changing the whole of the electric circuit part when a circuit should be changed.

In the portable overhead projector, because the projecting unit 1 and the stage 2 are attached to the arm part 3 swingably around the supporting shafts 50a and 60a, it is possible to fold and contain the projecting unit 1 and the stage 2 in the arm part 3. In this case, first, after locking of the arm part 3 due to the locking mechanism 510 is unlocked, the stage 2 is swung around the stage side supporting shaft 50a and is folded to contain in the arm part 3, as shown in FIG. 17. Next, the projection unit 1 is swung around the projection unit side supporting shaft 60a and is folded to contain in the arm part 3 in a state of the projection unit 1 and the stage 2 overlapped to each other, and these members are locked by the locking mechanism 510 of the arm part 3. Accordingly, it is possible to miniaturize the whole device. Since the arm part 3 has about a bible size corresponding to about B6 size in JIS, the size of the folded whole device comes to be about a bible size corresponding to about B6 size. It is possible for user, e.g., salesmen or the like, to conveniently carry such an overhead projector in their bags. Therefore, it is possible to obtain a portable overhead projector having an excellent portability.

Because the locking mechanism 510 for locking the projection unit 1 to the arm part 3 while contained and for locking the stage 2 to the arm part 3 while used, is provided, it is possible to surely lock the projection unit 1 or the stage 2 to the arm part 3 by the locking mechanism 510 while contained or while used, respectively, as occasion demands, and to reduce number of the locking mechanism 510, thereby to reduce number of parts.

Further, because the power switch 390 which is turned off to cut off power supply to the electric circuit part when the projection unit 1 is contained in the arm part 3, is provided, it is possible to surely prevent the interior of the projection unit 1 from heating even if the light source portion 140 is turned on while carrying, thereby to obtain a portable overhead projector with an excellent safety.

In order to use such a portable overhead projector, in contrast with the above-described operation, first, the projection unit 1 is swung to horizontally project a portion thereof to the arm part 3, thereafter the stage 2 is swung to horizontally project a portion thereof to the arm part 3, and in this state, the stage 2 is locked to the arm part 3 by the locking mechanism 510. The stage 2 and the arm part 3 are placed on a table, and the cover 420 of the projection unit 1 is raised, and is thereafter supported with a predetermined tilt angle shown in FIG. 16, by the supporting lever 460. Then, the image projection sheet 9 is placed on the Fresnel lens 8 on the stage 2 and is pressed down by the transparent sheet pressing plate 100.

At both sides of an end portion of the sheet pressing plate 100, the projecting shaft portions 110 having a rectangular shape section are provided, and at the side connected to the arm part 3 of the stage 2, the bearing portions 120 in which the shaft portions 110 are swingably set are provided. In each bearing portion 120, the insertion groove 130 having a width which corresponds to the short side of the section of the shaft portion 110 is provided toward the side to be connected with the arm part 3. Therefore, before the stage 2 is connected with the arm part 3, the shaft portions 110 can be easily set to the bearing portions 120 by inserting the shaft portions 110 into the bearing portions 120 through the insertion groove 130, and further even if someone intends to take out the shaft portions 110 through the insertion grooves 130 in a state of the stage 2 connected to the arm part 3, the sheet pressing plate 100 comes in contact with the arm part 3, so that the shaft portions 110 do not get out of the bearing portions 120. Accordingly, it is possible to surely hold down the image projection sheet 9.

Since the transparent sheet pressing plate 100 for pressing down the image projection sheet 9 which is a manuscript on the stage 2, is swingably provided, it is possible to prevent the image projection sheet 9 from rolling due to heat from the light source portion 140, curl of the image projection sheet 9 itself, or the like, during use.

Further, it is possible to raise and support the projection mirror 43 with a predetermined tilt angle only by raising the projection mirror 43, and to finely adjust the standing angle thereof by an angle adjusting mechanism. Thereby, it is possible to surely and excellently project a projection image at a desired position.

In the portable overhead projector, the light source part 140 is attached to the socket 240 which is provided on the closing cover 180 for the light source through the elastic member 230, so as to permit installation and removal thereof, and the closing cover 180 for the light source is provided to be swingable around a supporting shaft 250 which is movably attached to the projection unit 1. Accordingly, it is possible to easily install or remove the light source part 140 by swinging the closin cover 180 for the light source around the supporting shaft 250 to open. After the light source part 140 is installed to the closing cover 180, when the closing cover 180 for the light source is swung in a direction of the closing cover 180 being closed, or when the supporting shaft 250 is moved after such a closing of the cover, the front periphery portion of the reflector 140*b* can be surely pressed against the position regulating portion 280 by the elastic force of the elastic member 230, and thereby the light axis 610 of the light source 140*a* can be stably positioned, so that it is possible to install or change the light source part 140 very easily.

In the periphery of the light source part 140, the heat insulating plates 190, 200, 210, and 220 shutting off radiant heat from the light source part 140 are arranged, and the rising cut portion 190*a* which is inclined along the outer peripheral surface of the light source part 140 is provided to correspond to the closing cover 180 for the light source.

Therefore, it is possible to prevent the parts arranged around the light source part 140, e.g., the electric circuit part, the closing cover 180 for the light source or the like, from heating by radiant heat from the light source part 140. Since the rising cut portion 190*a* is provided to correspond to the closing cover 180 for the light source and the opening 190*b* corresponding the rising cut portion 190*a* is formed in the heat insulating plate 190, air heated by the light source part 140 can be discharged to the outside through the opening 190*b* of the heat insulating plate 190 and the air vents 180*a* of the closing cover 180 for the light source, so that the light source part 140 can be effectively cooed.

Because the light source part 140 is arranged in the light source containing part 290 which is arranged in the unit case 70, and outer cool air is introduced into the light source containing part 290 by using the cooling fan 170, the light source part 140 can be surely cooled. Thereby, it is possible to prevent the unit case 70 from thermal deformation due to heating of the light source 140*a*. Since the heat insulating plates 190, 200, 210, and 220 which form the light source containing part 290 are made of a metal, it is possible to protect the light source 140*a* rigidly and also to perform reinforcement of the unit case 70.

In the portable overhead projector, when the lights irradiated to the image projection sheet 9 is converged toward the projection lens 160 by the Fresnel lens 8, even if the total reflection mirror 150 comes extremely near the projection lens 160, the angle 3 between the incident light and the outgoing light on the light axis on the upper surface of the Fresnel lens 8 becomes large, e.g., about 14 because the length L1 between the light axis 610 of the light source 140*a* and the upper surface of the Fresnel lens 8 is short, e.g., about 183 mm. However, because the thickness of the Fresnel lens 8 is thin, e.g., not more than 1 mm, it is possible to obtain a good projection image by the reason similar to that explained referring to FIG. 7A.

Because the reflecting surface of the Fresnel lens 8 is formed to be aspherical so that as a portion is the nearer the center thereof the larger the radius of curvature of the portion is, as shown in FIG. 36, it is possible to surely gather also the light in the vicinity of the periphery in the lights to the projection lens 160, which are radiated from the light source part 140 to the Fresnel lens 8. Thereby, it is possible to improve the utilization efficiency of light, to prevent lowering of the illumination intensity in the vicinity of the periphery of the projection image, and to obtain a projection image having approximately uniform brightness wholly. Since the light from the light source part 140 is reflected by the Fresnel lens 8 to gather into the projection lens 160, it is possible to ensure enough optical path length from the light source part 140 to the projection lens 160.

The center of the Fresnel lens 8 is deviated to the extent of Dd from the side of the light source part 140 toward the side of the projection lens 160, as shown in FIG. 37, so that it is possible to let enough light from the light source part 140 into the projection lens 160, and to improve the brightness of the whole projection image.

In the above-described embodiments, the Fresnel lens 8 is formed to have a total thickness t1 of about 0.4 mm, a cut lens thickness t2 of about 0.2 mm, and a pitch of the Fresnel rings of about 0.35 mm. However, as the pitch of the Fresnel rings is the smaller than 0.35 mm, the total thickness t1 thereof can be smaller than 0.4 mm. According to using such a Fresnel lens, even if the length L1 between the light axis 610 of the light source 140*a* and the upper surface of the Fresnel lens 8 is shorter than that of the above-described embodiments, it is possible to reduce the deviation of the projected image and to miniaturize the whole device. Although the lower reflecting surface of the Fresnel lens 8 is formed as a body by sputtering of aluminum in the above-described embodiments, formation of the reflecting surface as a body is not necessarily required and it is possible to dispose a separate reflecting plate under the Fresnel lens 8.

In the above-described embodiments, the light from the light source 140a is reflected by the total reflection mirror 150 toward the Fresnel lens 8. However, the light from the light source 140a may be radiated to gather into the Fresnel lens 8 directly.

Further, in the above-described embodiments, the direction for projection is changed by the projection mirror 430 of the cover 420 when the image of the image projection sheet 9 is projected as an enlarged projection image through the projection lens 160. However, it is not necessarily required to change the direction for projection by using the projection mirror 430, and the image is projected on a screen as an enlarged projection image through the projection lens 160 directly, for example, by placing the arm part 3 on a table so that the projection unit 1 and the stage 2 are in a vertically standing state.

What is claimed is:

1. A portable overhead projector comprising:

a projection unit comprising at least a light source and a projection lens;

a stage comprising a Fresnel lens having a thickness not larger than 1 mm which has a reflecting surface faced to the projection unit, and an image projection sheet placed on the Fresnel lens, wherein the reflecting surface reflects the light from the light source toward the projection lens and the Fresnel lens gathers the reflected light by the reflecting surface to the projection lens; and an arm part for connecting the projection unit with the stage;

wherein the projection unit, the stage and the arm part can be folded into a size for the projector with dimensions which are not larger than approximately a length of 184 mm, a width of 135 mm, and a thickness of 58 mm.

2. A portable overhead projector as claimed in claim 1, wherein a transparent sheet pressing plate for pressing down the image projection sheet is swingably provided on the stage.

3. A portable overhead projector as claimed in claim 1, wherein the image projection sheet is formed in a predetermined size in which a desired image copying machine, and has a perforation for cutting it in a designated size of about a pocket notebook size, after printing.

4. A portable overhead projector as claimed in claim 1, wherein the image projection sheet has a designated size of about a pocket notebook size and is strippably adhered on a ground paper which have a size in which a desired image information can be printed by using a printer or a copying machine, and can be used as a image projection sheet by separating it from the ground paper after the desired image information is printed on the adhered image projection sheet.

5. A portable overhead projector comprising:

a projection unit comprising at least a light source and a projection lens, a stage comprising a Fresnel lens which has a reflecting surface faced to the projection unit, and an arm part for connecting the projection unit with the stage, wherein the projection unit and the stage can be folded to be contained within the arm part.

6. A portable overhead projector as claimed in claim 5, wherein an image projection sheet which is a manuscript is placed on the Fresnel lens, and is formed in a size in which a desired image information can be printed by using a printer or a copying machine and has a perforation for cutting it in a designated size of about a pocket notebook size, after printing.

7. A portable overhead projector as claimed in claim 5, wherein an image projection sheet which is a manuscript is placed on the Fresnel lens, and the image projection sheet has a designated size of about a pocket notebook size and is strippably adhered on a ground paper which have a size in which a desired image information can be printed by using a printer or a copying machine, and can be used as a image projection sheet by separating it from the ground paper after the desired image information is printed on the adhered image projection sheet.

8. A portable overhead projector as claimed in claim 5, wherein the reflecting surface of the Fresnel lens is formed to be aspherical so that the radius of curvature of the portion in the periphery thereof is smaller than that of the portion near the center thereof.

9. A portable overhead projector as claimed in claim 8, wherein the center of the Fresnel lens is deviated from the side of the light source part toward the side of the projection lens.

10. A portable overhead projector as claimed in claim 5, wherein a transparent sheet pressing plate for pressing down the image projection sheet is swingably provided on the stage.

11. A portable overhead projector as claimed in claim 10, wherein projecting shaft portions having a rectangle-shaped section are provided at both sides of an end portion of the sheet pressing plate, bearing portions in which the shaft portions are rotatably set are provided at the side of the stage connected to the arm part, and an insertion groove having a width which corresponds to the short side of the section of the shaft portion is provided in each bearing portion, toward the side to be connected to the arm part.

12. A portable overhead projector comprising:

a projection unit comprising at least a light source and a projection lens, a stage comprising a Fresnel lens which has a reflecting surface faced to the projection unit, and an arm part for connecting the projection unit with the stage, wherein the projection unit and the arm part can be folded to be contained within the stage, said stage having an internal space sized to accommodate said folded projection unit and said folded arm part.

13. A portable overhead projector as claimed in claim 12, wherein the projection unit, the stage and the arm part can be folded, and the projection unit and the arm part can be folded to be contained within said internal space of the stage.

14. A portable overhead projector as claimed in claim 12, wherein the arm part can be expanded or contracted, and the folded projection unit is contained in said internal space of the stage by contracting the arm part.

15. A portable overhead projector comprising:

a projection unit comprising at least a light source, a projection lens, and a cooling fan for cooling the light source;

a stage comprising a Fresnel lens which has a reflecting surface faced to the projection unit; and an arm part for connecting the projection unit with the stage so that the projection unit and the stage can be folded;

wherein an electric circuit part including a driving circuit for driving the light source and the cooling fan is installed in the projection unit; and wherein the projection unit and the stage can be folded to be contained within the arm part.

16. A portable overhead projector as claimed in claim 15, wherein the reflecting surface of the Fresnel lens is formed to be aspherical so that the radius of curvature of the portion in the periphery thereof is smaller than that of the portion near the center thereof.

17. A portable overhead projector as claimed in claim 16, wherein the center of the Fresnel lens is deviated from the side of the light source part toward the side of the projection lens.

18. A portable overhead projector comprising:

a projection unit comprising at least a light source part and a projection lens; and a stage comprising a Fresnel lens which has a reflecting surface for reflecting the light from the light source in the projection unit toward the projection lens;

wherein the light source part comprises a light source and a reflector for reflecting the light from the light source, and is attached to the projection unit through an elastic member so as to permit installation and removal thereof so that the light source part can be moved in a desired direction, and the front periphery portion of the reflector is pressed against a position regulating portion by the elastic force of the elastic member to be positioned.

19. A portable overhead projector as claimed in claim 18, wherein the light source is attached to a closing cover member through the elastic member so as to permit installation and removal thereof, and the closing cover member is provided swingably around a supporting shaft which is movably attached to the projection unit.

20. A portable overhead projector as claimed in claim 19, wherein a heat insulating plate for cutting off the radiant heat from the light source part, is provided in the periphery of the light source part, and a rising cut portion which is inclined along the outer peripheral surface of the light source part is provided on the heat insulating plate corresponding to the closing cover member.

21. A portable overhead projector as claimed in claim 18, wherein the projection unit comprises a projection mirror for reflecting the projection light from the projection lens, a standing mechanism for standing the projection mirror with a predetermined angle, and an angle adjusting mechanism for finely adjusting the standing angle of the projection mirror which is stood with the predetermined angle by the standing mechanism.

22. A portable overhead projector comprising:

a projection unit comprising at least a light source, a projection lens, and a cooling fan for cooling the light source;

a stage comprising a Fresnel lens which has a reflecting surface faced to the projection unit; and an arm part for connecting the projection unit with the stage so that the projection unit and the stage can be folded;

wherein an electric circuit part including a driving circuit for driving the light source and the cooling fan is installed in the projection unit; and wherein said projection unit includes a power switch which is actuated to cut off power supply to the electric circuit part when the projection unit is contained within the arm part.

23. A portable overhead projector as claimed in claim 22, wherein the reflecting surface of the Fresnel lens is formed to be aspherical so that the radius of curvature of the portion in the periphery thereof is smaller than that of the portion near the center thereof.

24. A portable overhead projector as claimed in claim 23, wherein the center of the Fresnel lens is deviated from the side of the light source part toward the side of the projection lens.

* * * * *